United States Patent
Nakatani et al.

(10) Patent No.: US 9,363,400 B2
(45) Date of Patent: Jun. 7, 2016

(54) IMAGE FORMING APPARATUS

(71) Applicant: Sharp Kabushiki Kaisha, Osaka-shi, Osaka (JP)

(72) Inventors: Hiroshi Nakatani, Osaka (JP); Norio Tomita, Osaka (JP); Ryosuke Sakai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/422,803

(22) PCT Filed: Sep. 9, 2013

(86) PCT No.: PCT/JP2013/074230
§ 371 (c)(1),
(2) Date: Feb. 20, 2015

(87) PCT Pub. No.: WO2014/045916
PCT Pub. Date: Mar. 27, 2014

(65) Prior Publication Data
US 2015/0249764 A1    Sep. 3, 2015

(30) Foreign Application Priority Data

Sep. 18, 2012  (JP) ................................ 2012-204604
Aug. 22, 2013  (JP) ................................ 2013-172275

(51) Int. Cl.
| *H04N 1/60* | (2006.01) |
| *H04N 1/00* | (2006.01) |
| *G03G 15/01* | (2006.01) |
| *G03G 15/00* | (2006.01) |
| *H04N 1/46* | (2006.01) |
| *G06F 3/12* | (2006.01) |

(52) U.S. Cl.
CPC ....... *H04N 1/00779* (2013.01); *G03G 15/0131* (2013.01); *G03G 15/50* (2013.01); *H04N 1/00602* (2013.01); *H04N 1/00702* (2013.01); *H04N 1/00785* (2013.01); *H04N 1/46* (2013.01); *G03G 15/6564* (2013.01); *G03G 2215/0132* (2013.01); *H04N 2201/0094* (2013.01)

(58) Field of Classification Search
None
See application file for complete search history.

(56) References Cited

U.S. PATENT DOCUMENTS

| 2008/0054555 A1 | 3/2008 | Atsumi et al. |
| 2008/0056790 A1 | 3/2008 | Maruyama |
| 2011/0164895 A1 | 7/2011 | Ishikake et al. |
| 2012/0141179 A1 | 6/2012 | Atsumi |

FOREIGN PATENT DOCUMENTS

| JP | 2003-330334 A | 11/2003 |
| JP | 2006-030693 A | 2/2006 |
| JP | 2008-083665 A | 4/2008 |
| JP | 2008-137739 A | 6/2008 |
| JP | 2008-225308 A | 9/2008 |
| JP | 2009-080419 A | 4/2009 |
| JP | 2011-141437 A | 7/2011 |
| JP | 2012-118454 A | 6/2012 |

*Primary Examiner* — Dov Popovici
(74) *Attorney, Agent, or Firm* — Keating & Bennett, LLP

(57) ABSTRACT

An image forming apparatus includes a registration roller configured to adjust a starting time point of conveying a paper sheet; a printing unit configured to form a color image or a monochrome image on a photosensitive drum, and transfer the image to the paper sheet at a downstream side with respect to the registration roller in a conveyance direction to print; a line sensor configured to detect a conveyance position at an upstream side with respect to the printing unit in the conveyance direction; and a control unit configured to obtain a displacement amount with respect to a preset reference position based on the conveyance position, correct an image formation position according to the displacement amount to correct a printing position on the paper sheet, and change a correction method for the printing position according to whether any of the color image and the monochrome image is formed.

10 Claims, 20 Drawing Sheets

FIG.2
(a)
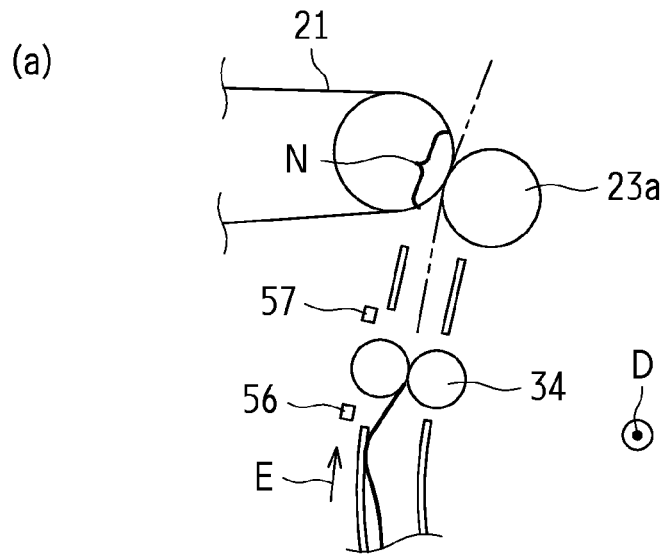
(b)
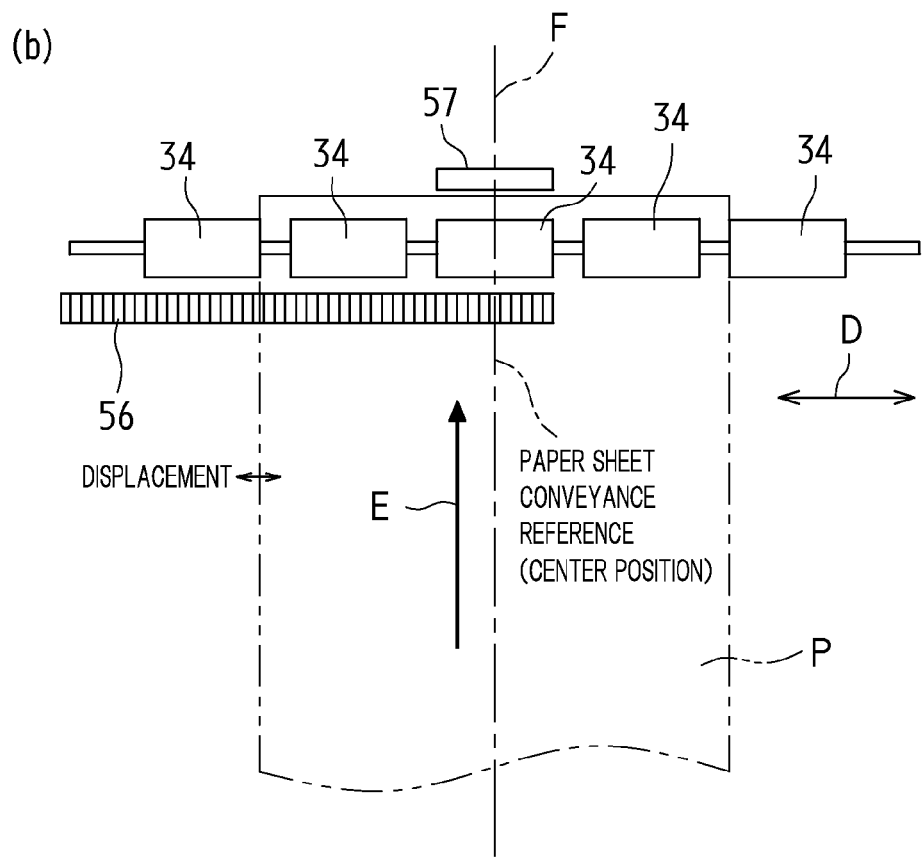

FIG.8

| ITEM | FIRST CORRECTION MODE | | SECOND CORRECTION MODE | |
|---|---|---|---|---|
| | COLOR | MONOCHROME | COLOR | MONOCHROME |
| FEATURE | SPEED AND IMAGE QUALITY ARE BALANCED | | SPEED IS PRIORITIZED | |
| CORRECTION METHOD | ALL-AVERAGE-VALUE PREDICTION CORRECTION | REAL-TIME CORRECTION | ALL-AVERAGE-VALUE PREDICTION CORRECTION | |
| COPY PERFORMANCE (CPM) | COLOR:100% | MONOCHROME:70% | PERFORMANCE NOT DEGRADED DUE TO CORRECTION COLOR:100% MONOCHROME:100% | |
| APPLICATION | FIRST SECOND THIRD FOURTH FIFTH — ALL-AVERAGE-VALUE PREDICTION CORRECTION | FIRST SECOND THIRD FOURTH FIFTH — REAL-TIME CORRECTION | FIRST SECOND THIRD FOURTH FIFTH — ALL-AVERAGE-VALUE PREDICTION CORRECTION | |

| ITEM | THIRD CORRECTION MODE | | FOURTH CORRECTION MODE | |
|---|---|---|---|---|
| | COLOR | MONOCHROME | COLOR | MONOCHROME |
| FEATURE | IMAGE QUALITY IS PRIORITIZED | | SPEED AND IMAGE QUALITY ARE BALANCED | |
| CORRECTION METHOD | REAL-TIME CORRECTION | | MOST RECENT PREDICTION CORRECTION | |
| COPY PERFORMANCE (CPM) | DUE TO DETERIORATION IN PERFORMANCE COLOR:50% MONOCHROME:70% | | PERFORMANCE NOT DEGRADED EXCEPT FOR THE FIRST ONE COLOR:ALMOST 100% MONOCHROME:ALMOST 100% | |
| APPLICATION | FIRST SECOND THIRD FOURTH FIFTH — REAL-TIME CORRECTION | | FIRST — REAL-TIME CORRECTION | SECOND THIRD FOURTH FIFTH — PREDICTION CORRECTION |

FIG.19

| ITEM | FIFTH CORRECTION MODE | | SIXTH CORRECTION MODE | |
|---|---|---|---|---|
| | COLOR | MONOCHROME | COLOR | MONOCHROME |
| FEATURE | IMAGE QUALITY IS PRIORITIZED | | SPEED AND IMAGE QUALITY ARE BALANCED | |
| CORRECTION METHOD | REAL-TIME PAPER SHEET MOVING CORRECTION | REAL-TIME PAPER SHEET MOVING CORRECTION | ALL-AVERAGE-VALUE PREDICTION CORRECTION | REAL-TIME PAPER SHEET MOVING CORRECTION |
| COPY PERFORMANCE (CPM) | COLOR:80% | MONOCHROME:80% | COLOR:100% | MONOCHROME:80% |
| APPLICATION | FIRST SECOND THIRD FOURTH FIFTH — REAL-TIME PAPER SHEET MOVING CORRECTION | | FIRST SECOND THIRD FOURTH FIFTH — ALL-AVERAGE-VALUE PREDICTION CORRECTION | FIRST SECOND THIRD FOURTH FIFTH — REAL-TIME PAPER SHEET MOVING CORRECTION |

| ITEM | SEVENTH CORRECTION MODE | | EIGHTH CORRECTION MODE | |
|---|---|---|---|---|
| | COLOR | MONOCHROME | COLOR | MONOCHROME |
| FEATURE | IMAGE QUALITY IS PRIORITIZED | | SPEED AND IMAGE QUALITY ARE BALANCED | |
| CORRECTION METHOD | REAL-TIME JUDGMENT PAPER SHEET MOVING CORRECTION | REAL-TIME PAPER SHEET MOVING CORRECTION | MOST RECENT PREDICTION CORRECTION | REAL-TIME PAPER SHEET MOVING CORRECTION |
| COPY PERFORMANCE (CPM) | COLOR:90% | MONOCHROME:80% | PERFORMANCE NOT DEGRADED EXCEPT FOR THE FIRST ONE COLOR:ALMOST 100% | MONOCHROME:80% |
| APPLICATION | FIRST SECOND THIRD FOURTH FIFTH — REAL-TIME JUDGMENT PAPER SHEET MOVING CORRECTION | | FIRST — REAL-TIME CORRECTION; SECOND THIRD FOURTH FIFTH — PREDICTION CORRECTION | FIRST SECOND THIRD FOURTH FIFTH — REAL-TIME PAPER SHEET MOVING CORRECTION |

IMAGE FORMING APPARATUS

TECHNICAL FIELD

The present invention relates to an image forming apparatus that allows selectively forms a color image or a monochrome image.

BACKGROUND ART

This type of image forming apparatus uniformly charges an image carrier surface, scans the image carrier surface with light beam to form an electrostatic latent image on the image carrier surface. Then, the image forming apparatus develops the electrostatic latent image on the image carrier surface to form a toner image on the image carrier surface, transfers the toner image from the image carrier to a recording paper sheet. Next, the image forming apparatus heats and applies pressure on the recording paper sheet to fix the toner image on the recording paper sheet.

The toner image is transferred from the image carrier to the recording paper sheet by sandwiching the recording paper sheet at a nip region between the image carrier and a transfer roller. Registration rollers are provided at an upstream side with respect to this nip region in a conveyance direction of the recording paper sheet. The registration rollers once stop the recording paper sheet to adjust a starting time point of conveying the recording paper sheet from the registration rollers so as to match the starting time point with a transfer timing of the toner image at the nip region.

Here, if the nip region, which is disposed between the image carrier and the transfer roller, if the recording paper sheet is displaced in a direction perpendicular to a paper sheet conveyance direction (a main-scanning direction), a printing position of the toner image on the recording paper sheet is displaced in the main-scanning direction. In view of this, a paper sheet position sensor is provided at an upstream side with respect to the registration rollers in the conveyance direction of the recording paper sheet. The paper sheet position sensor detects the conveyance position of the recording paper sheet in the main-scanning direction. Based on the conveyance position of the recording paper sheet, which is detected by the paper sheet position sensor, an image formation position of the toner image on the image carrier is corrected in the main-scanning direction to prevent the printing position of the toner image on the recording paper sheet from being displaced.

For example, Patent Literature 1 adjusts an image formation position of an image (a toner image) on an image carrier based on a preset main-scanning start adjustment position and a main-scanning start adjustment position detected by a side registration sensor (a paper sheet position sensor).

In Patent Literature 2, in the case where at least one of an amount of lateral displacement (a displacement amount in a main-scanning direction) and an amount of skew of a recording paper sheet, which are detected by a paper sheet position sensor (CIS), is larger than a first threshold (5 mm), printing of the recording paper sheet is stopped. Alternatively, in the case where at least one of the amount of lateral displacement and the amount of skew of the recording paper sheet is equal to or less than the first threshold and is larger than a second threshold (2 mm), the printing of the recording paper sheet is continued.

Further, Patent Literature 3 uses a displacement amount of the previous recording paper sheet detected by a paper sheet position sensor (CIS) to correct an image formation position on an image carrier. This prevents a displacement of an image on a recording paper sheet. Additionally, this technique calculates an average value of the displacement amounts of previous respective recording paper sheets and uses this average value to correct the image formation position on the image carrier. This prevents the displacement of the image on the recording paper sheet.

Patent Literature 4 switches a linear mode and a high speed correction mode. The linear mode corrects an image formation position on an image carrier using a displacement amount of the recording paper sheet of this time, which is detected by a paper sheet position sensor (CIS). The high speed correction mode corrects the image formation position on the image carrier using the displacement amount of the previous recording paper sheet detected by the CIS.

Thus, the image formation position on the image carrier is corrected in the main-scanning direction to prevent the displacement of the printing position of the image on the recording paper sheet or a plurality of correction methods are used according to the need.

CITATION LIST

Patent Literature

PATENT LITERATURE 1: Japanese Unexamined Patent Application Publication No. 2006-30693
PATENT LITERATURE 2: Japanese Unexamined Patent Application Publication No. 2003-330334
PATENT LITERATURE 3: Japanese Unexamined Patent Application Publication No. 2008-83665
PATENT LITERATURE 4: Japanese Unexamined Patent Application Publication No. 2012-118454

SUMMARY OF INVENTION

Technical Problem

In the case of a monochrome image, a latent image is formed on one image carrier, this latent image is developed, and the image is transferred from the image carrier to a recording paper sheet. This takes short time from writing the latent image to the image carrier until transferring the image.

In contrast to this, in the case of a color image, respective latent images are formed on a plurality of image carriers corresponding to a plurality of colors, these latent images are developed into the images with respective colors, and the images on the respective image carriers are sequentially transferred. Respective times taken from the writing of the latent images to the respective image carriers until transferring the images with the respective colors differ. Since shorting the longest time has its limit, this longest time becomes tremendously longer than the time taken for the monochrome image.

Therefore, the number of printed sheets of the monochrome images per unit time is larger than the number of printed sheets of the color images per unit time.

On the other hand, as described above, there is provided the plurality of correction methods to correct the image formation position on the image carrier. However, times taken for performing these respective correction methods differ. Additionally, even with the same correction method, the respective times taken for performing the correction method may differ between the monochrome image and the color image. In view of this, assume the case of printing the monochrome image. Even if the correction method where the reduction in the number of printed sheets per unit time falls within an allowable range is selected and applied, if printing the color image without changing or canceling this correction method, the number of printed sheets per unit time was sometimes reduced to an undesirable extent.

However, the conventional image forming apparatus does not use these correction methods according to the need considering the color image and the monochrome image. Therefore, it cannot be said that this image forming apparatus is easy to use for users.

The present invention has been made to solve the above-described conventional problems, and it is an object of the present invention to provide an image forming apparatus that allows appropriately setting a correction method for an image formation position at an image carrier according to whether a color image or a monochrome image is formed.

Solutions to the Problems

To solve the above-described problems, an image forming apparatus of the present invention includes a registration roller, a printing section, a paper sheet position detection section, and a control section. The registration roller is configured to adjust a starting time point of conveying a paper sheet. The printing section is configured to form a color image or a monochrome image on an image carrier and transfer the color image or the monochrome image from the image carrier to the paper sheet at a downstream side with respect to the registration roller in a conveyance direction of the paper sheet. The paper sheet position detection section is configured to detect a conveyance position of the paper sheet at an upstream side with respect to the printing section in the conveyance direction of the paper sheet. The control section is configured to obtain a displacement amount of the paper sheet with respect to a preset reference position of the paper sheet based on the conveyance position of the paper sheet detected by the paper sheet position detection section, correct an image formation position of the color image or the monochrome image on the image carrier according to the displacement amount to correct a printing position of the color image or the monochrome image on the paper sheet, and change a correction method for the printing position according to whether any of the color image and the monochrome image is formed.

This image forming apparatus changes the correction method for the image formation position according to whether the color image or the monochrome image is formed. This allows reducing a degree of reduction of the number of printed sheets per unit time of the color images.

In the image forming apparatus of the present invention, the control section may be configured to: perform prediction correction for the color image preceding transfer of the color image on the paper sheet to correct the image formation position of the color image on the image carrier according to a displacement amount of another paper sheet based on a conveyance position of the other paper sheet detected by the paper sheet position detection section in a past; and perform real-time correction for the monochrome image preceding transfer of the monochrome image on the paper sheet to correct the image formation position of the monochrome image on the image carrier according to the displacement amount of the paper sheet based on the conveyance position of the paper sheet on which the monochrome image is to be transferred. The conveyance position may be detected by the paper sheet position detection section. A maximum number of printed sheets of paper sheets per unit time of when the prediction correction is performed is preferably larger than a maximum number of printed sheets of paper sheets per unit time of when the real-time correction is performed.

Since the real-time correction uses the displacement amount of the paper sheet of the time, after the paper sheet position detection section detects the conveyance position of the paper sheet, it is necessary to form an image on the image carrier and correct the image formation position. This lengthens the image formation time. In contrast to this, since the prediction correction uses the displacement amount of previous paper sheets, this correction allows forming an image on the image carrier and correcting the image formation position without waiting for the detection of the conveyance position of the paper sheet by the paper sheet position detection section. This shortens the image formation time. In view of this, application of the prediction correction to the color image whose number of printed sheets per unit time is small and application of the real-time correction to the monochrome image whose number of printed sheets per unit time is large reduces the difference in the number of printed sheets between the color image and the monochrome image.

Further, the image forming apparatus of the present invention may have a plurality of correction methods including the prediction correction and the real-time correction. The control section may be configured to selectively apply any of the plurality of correction methods to both the color image and the monochrome image to correct the image formation position of the color image or the monochrome image on the image carrier. For example, the following is preferable. The image forming apparatus is configured to make the plurality of correction methods correspond to the color image and the monochrome image. The image forming apparatus is configured to set a plurality of combinations of correction methods for the color image and correction methods for the monochrome image different from one another as a plurality of correction modes. The plurality of correction modes include a correction mode. The correction mode is configured to perform the prediction correction on the color image and perform the real-time correction on the monochrome image. The image forming apparatus includes a correction method selection operation section configured to be operated for selecting any of the plurality of correction modes. The control section is configured to correct the image formation position of the color image or the monochrome image on the image carrier according to a correction mode selected by the correction method selection operation section. This allows supporting user's various requests.

In the image forming apparatus of the present invention, the paper sheet position detection section may be configured to detect the conveyance position of the paper sheet in a direction perpendicular to the conveyance direction of the paper sheet. The control section may be configured to obtain a displacement amount of the paper sheet with respect to the reference position preset in the direction perpendicular to the conveyance direction of the paper sheet based on the conveyance position of the paper sheet, so as to correct the image formation position of the color image or the monochrome image on the image carrier in the direction perpendicular to the conveyance direction of the paper sheet according to the displacement amount.

Further, in the image forming apparatus of the present invention, a conveyance direction paper sheet detection section may be configured to detect a conveyance timing of the paper sheet in the conveyance direction of the paper sheet at a downstream side with respect to the registration roller in the conveyance direction of the paper sheet. A correction instruction operation section may be configured to be operated to instruct whether to correct the image formation position of the color image or the monochrome image on the image carrier in the conveyance direction of the paper sheet or not.

The control section may be configured to correct the image formation position of the color image or the monochrome image on the image carrier in the conveyance direction of the paper sheet according to the conveyance timing of the paper sheet detected by the conveyance direction paper sheet detection section, so as to correct the printing position of the color image or the monochrome image on the paper sheet when the correction instruction operation section instructs correction of the image formation position.

In the image forming apparatus of the present invention, a moving section may be disposed at an upstream side with respect to the printing section in the conveyance direction of the paper sheet. The moving section may be configured to move the paper sheet in a direction perpendicular to the conveyance direction of the paper sheet. The paper sheet position detection section may be configured to detect the conveyance position of the paper sheet in the direction perpendicular to the conveyance direction of the paper sheet. The control section may be configured to obtain a displacement amount of the paper sheet with respect to a reference position in the direction perpendicular to the conveyance direction of the paper sheet based on the conveyance position of the paper sheet detected by the paper sheet position detection section, and control the moving section according to the displacement amount of the paper sheet, so as to move the paper sheet in the direction perpendicular to the conveyance direction of the paper sheet to correct the printing position of the color image or the monochrome image on the paper sheet.

Here, the image forming apparatus controls the moving section according to the displacement amount of the paper sheet based on the conveyance position of the paper sheet detected by the paper sheet position detection section to move the paper sheet in the direction perpendicular to the conveyance direction of the paper sheet so as to correct the printing position of the color image or the monochrome image with respect to the paper sheet. This allows correcting the image formation position of the paper sheet in a conveyance process of the paper sheet, allowing real-time correction of the image formation position of the paper sheet for each paper sheet.

In the image forming apparatus of the present invention, the control section may be configured: to judge whether the displacement amount of the paper sheet is equal to or more than a predetermined value or not, to correct the displacement amount of the paper sheet if the displacement amount of the paper sheet is equal to or more than the predetermined value, and to correct the displacement amount of the paper sheet if the displacement amount of the paper sheet is less than the predetermined value.

In this case, simplifying the correction process of the displacement amount of the paper sheet allows speeding up the correction process.

Further, in the image forming apparatus of the present invention, the control section may be configured to: correct the image formation position of the color image on the image carrier to correct the image formation position of the color image on the paper sheet for the color image, and control the moving section so as to move the paper sheet in the direction perpendicular to the conveyance direction of the paper sheet to correct the image formation position of the monochrome image on the paper sheet for the monochrome image.

In the image forming apparatus of the present invention, the moving section may be configured to move the registration roller in a middle of conveyance of the paper sheet by the registration roller in the direction perpendicular to the conveyance direction of the paper sheet to move the paper sheet.

Advantageous Effects of Invention

The present invention changes a correction method for image formation position according to whether a color image or a monochrome image is formed. This allows reducing a degree of reduction of the number of printed sheets per unit time of color images.

BRIEF DESCRIPTION OF THE DRAWINGS

FIG. 2A is an enlarged side view illustrating an arrangement relationship of each registration roller, a conveyance direction paper sheet sensor, and a line sensor in the image forming apparatus in FIG. 1. FIG. 2B is an enlarged plan view illustrating an arrangement relationship of each registration roller, a conveyance direction paper sheet sensor, and a line sensor in the image forming apparatus in FIG. 1.

FIG. 8 illustrates embodiments of a correction method for printing position according to a color image and a monochrome image in the present invention, and is drawings and tables illustrating a first correction mode of a first embodiment, a second correction mode of a second embodiment, a third correction mode of a third embodiment, and a fourth correction mode of a fourth embodiment.

FIG. 19 illustrates embodiments of the correction method for the printing position according to the color image and the monochrome image in the present invention, and is drawings and tables illustrating a fifth correction mode of a fifth embodiment, a sixth correction mode of a sixth embodiment, a seventh correction mode of a seventh embodiment, and an eighth correction mode of an eighth embodiment.

DESCRIPTION OF EMBODIMENTS

Embodiments of the present invention will be described below by referring to the accompanying drawings.

Figure 1:
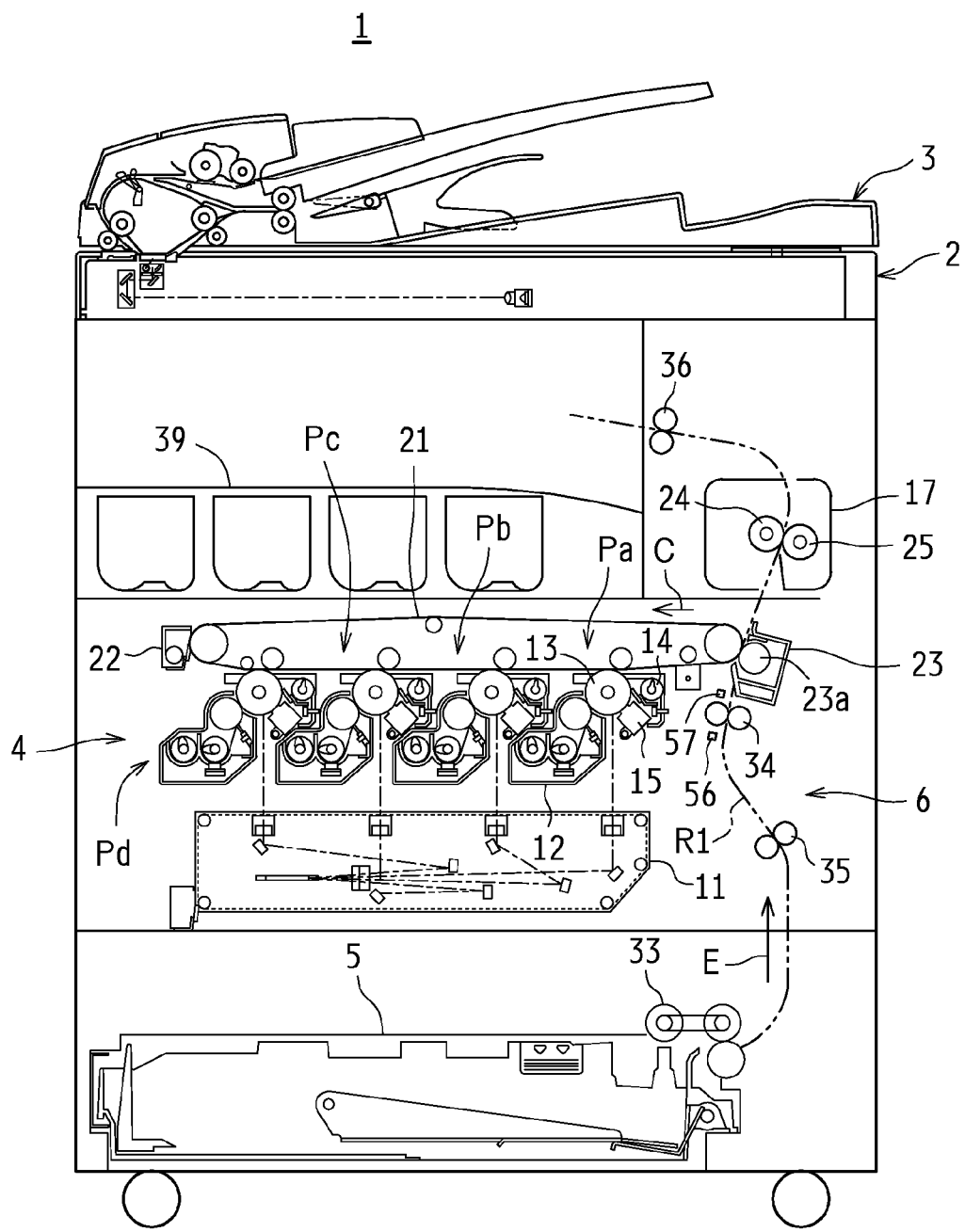
FIG. 1 is a cross-sectional view illustrating an image forming apparatus of one embodiment of the present invention.

FIG. 1 is a cross-sectional view illustrating an image forming apparatus of one embodiment of the present invention. This image forming apparatus 1 has a copy function that reads a document and performs printing on a recording paper sheet. The image forming apparatus 1 includes a document reading apparatus 2, a document conveyance apparatus (ADF) 3, a printing unit 4, a sheet feed cassette 5, a paper sheet conveying unit 6, and a similar unit. A main body of the image forming apparatus 1 builds in the printing unit 4, the sheet feed cassette 5, and the paper sheet conveying unit 6. The document reading apparatus 2 and the document conveyance apparatus 3 are mounted to an upper side of the main body of the image forming apparatus 1.

Image data that the image forming apparatus 1 handles correspond to color images using respective colors of black (K), cyan (C), magenta (M), and yellow (Y), or corresponds to a monochrome image using a single color (for example, black). In view of this, in the printing unit 4, development apparatuses 12, photosensitive drums 13, drum cleaning apparatuses 14, charging apparatuses 15, and similar apparatuses or units are disposed for each of four to form four types of toner images according to the respective colors. Each apparatus or unit corresponds to black, cyan, magenta, and yellow. Thus, four image stations Pa, Pb, Pc, and Pd are configured.

When forming the color image, the respective image stations Pa, Pb, Pc, and Pd operate. The drum cleaning apparatuses 14 remove and recover residual toner at the surfaces of the photosensitive drums 13 of all of the respective image stations Pa, Pb, Pc, and Pd. Then, the charging apparatuses 15 uniformly charge the surfaces of the photosensitive drums 13 at a predetermined electric potential. A light scanning device 11 exposes the surfaces of the photosensitive drums 13 to form electrostatic latent images at the surfaces. Then, the development apparatuses 12 develop the electrostatic latent images on the surfaces of the photosensitive drums 13 and form toner images at the surfaces of the photosensitive drums 13. Thus, the toner images with respective colors are formed at the surfaces of the respective photosensitive drums 13.

When forming the monochrome image, only the image station Pa operates. Therefore, the drum cleaning apparatus 14 removes and recovers residual toner at the surface of the photosensitive drum 13 of only the image station Pa. Then, the charging apparatus 15 uniformly charges the surface of the photosensitive drum 13 at a predetermined electric potential. The light scanning device 11 exposes the surface of the photosensitive drum 13 to form an electrostatic latent image at the surface. Then, the development apparatus 12 develops the electrostatic latent image on the surface of the photosensitive drum 13 and forms a monochrome toner image at the surface of the photosensitive drum 13.

After this, while an intermediate transfer belt 21 is moved around an arrow direction C, a belt cleaning apparatus 22 removes and recovers residual toner at the intermediate transfer belt 21. Then, a toner image with each color formed at the surface of each photosensitive drum 13 (or a monochrome toner image formed at the surface of the single photosensitive drum 13) is transferred to the intermediate transfer belt 21. The toner image with each color is superimposed to the intermediate transfer belt 21, thus a color toner image is formed.

A nip region is formed between the intermediate transfer belt 21 and a transfer roller 23a of a secondary transfer apparatus 23. The recording paper sheet conveyed through an S-shaped paper sheet conveyance path R1 is conveyed while being sandwiched by the nip region. The color toner image (or the monochrome toner image) on the surface of the intermediate transfer belt 21 is transferred on the recording paper sheet. Then, the recording paper sheet is sandwiched between a heating roller 24 and a pressing roller 25 of a fixing apparatus 17, and heated and pressurized for fixing the color toner image (or the monochrome toner image) on the recording paper sheet.

On the other hand, at the paper sheet conveying unit 6, pickup rollers 33 extract the recording paper sheet from the sheet feed cassette 5. This recording paper sheet is conveyed through the paper sheet conveyance path R1 and then passes through the secondary transfer apparatus 23 and the fixing apparatus 17. Then, the recording paper sheet is carried out to a discharge tray 39 via discharge rollers 36. This paper sheet conveyance path R1 includes respective registration rollers 34, respective conveyance rollers 35, the respective discharge rollers 36, or a similar part. The registration rollers 34 start conveying the recording paper sheets matching transfer timing of the toner image at the nip region between the intermediate transfer belt 21 and the transfer roller 23a after the recording paper sheets are once stopped and the top of the recording paper sheets are aligned. The conveyance rollers 35 promote conveyance of the recording paper sheets.

With the image forming apparatus 1, the conveyance position of the recording paper sheet is displaced due to various causes, resulting in a displacement of the printing position of the toner image on the recording paper sheet. In view of this, the image forming apparatus 1 includes a line sensor 56 at the upstream side with respect to each registration roller 34 in a paper sheet conveyance direction (a sub-scanning direction) E. The line sensor 56 detects a side edge of the recording paper sheet. Using a side edge position of the recording paper sheet in the main-scanning direction, which is detected by the line sensor 56, the printing position of the toner image in the main-scanning direction on the recording paper sheet is corrected.

The image forming apparatus 1 also includes a conveyance direction paper sheet sensor 57 at a downstream side with respect to each registration roller 34 in the paper sheet conveyance direction (the sub-scanning direction) E. The conveyance direction paper sheet sensor 57 detects the top edge of the recording paper sheet. Time from a starting time point of conveying the recording paper sheet by the respective registration rollers 34 until a time point of detecting the top edge of the recording paper sheet by the conveyance direction paper sheet sensor 57 is obtained. Using this time, the printing position of the toner image in the paper sheet conveyance direction E on the recording paper sheet is corrected.

The following describes a configuration to correct the printing position of the toner image on the recording paper sheet. FIG. 2A is an enlarged side view illustrating an arrangement relationship of each registration roller 34, the conveyance direction paper sheet sensor 57, and the line sensor 56. FIG. 2B is an enlarged plan view illustrating the arrangement relationship of each registration roller 34, the conveyance direction paper sheet sensor 57, and the line sensor 56. As illustrated in FIG. 2A and FIG. 2B, the line sensor 56 is disposed at the upstream side with respect to each registration roller 34 in the paper sheet conveyance direction E. The conveyance direction paper sheet sensor 57 is disposed at a downstream side with respect to each registration roller 34 in the paper sheet conveyance direction E. Further, the intermediate transfer belt 21 and the transfer roller 23a are disposed at the downstream side with respect to the conveyance direction paper sheet sensor 57.

With the respective registration rollers 34 each temporarily stopped, the top edge of the recording paper sheet conveyed by the respective conveyance rollers 35 is struck against each registration roller 34. The top edge of the recording paper sheet is aligned parallel to each registration roller 34. The line sensor 56 detects the side edge position of the recording paper sheet in the main-scanning direction. After this, the respective registration rollers 34 start conveying the recording paper sheet, and the conveyance direction paper sheet sensor 57 detects the top edge of the recording paper sheet. Thus, the recording paper sheet is conveyed to a nip region N, which is disposed between the intermediate transfer belt 21 and the transfer roller 23a.

The line sensor 56 has, for example, half the length or more of the maximum width of the recording paper sheets so as to detect positions of one side edges of the recording paper sheets at the minimum width to maximum width. Additionally, the line sensor 56 is arranged so as to be across from the one side edge of the recording paper sheet at the maximum width to the center of the recording paper sheet conveyed along the paper sheet conveyance path R1. This line sensor 56 is, for example, a Contact Image Sensor (hereinafter referred to as a CIS). The line sensor 56 includes a light source and a plurality of light receiving elements. The light source emits line-shaped light along a main-scanning direction D on the paper sheet conveyance path R1. The light receiving elements are arranged in the main-scanning direction D and receive reflected light from the recording paper sheet at the paper sheet conveyance path R1. A position between a position of the light receiving element that receives the reflected light from the recording paper sheet at the paper sheet conveyance path R1 and a position of the light receiving element that does not receive the reflected light is detected as one side edge position of the recording paper sheet. As the line sensor 56, the line sensor 56 that has a length equal to or more than the maximum width of the recording paper sheet and can detect both edge positions of the recording paper sheet may be applicable.

A position of the conveyance direction paper sheet sensor 57 is determined at a position of separated from the nip region N between the respective registration rollers 34 by a specified distance to the downstream side in the paper sheet conveyance direction E and a center position of the respective registration rollers 34 in a longitudinal direction (the main-scanning direction D perpendicular to the paper sheet conveyance direction E). The conveyance direction paper sheet sensor 57 is, for example, an optical sensor that includes light emitting elements and light receiving elements. The conveyance direction paper sheet sensor 57 emits light of the light emitting elements to the paper sheet conveyance path R1 of the recording paper sheet. The conveyance direction paper sheet sensor 57 receives the reflected light from the recording paper sheet conveyed along the paper sheet conveyance path R1 at the light receiving elements. Then, the conveyance direction paper sheet sensor 57 detects the top edge of the recording paper sheet by an output change in the light receiving elements.

Figure 3:
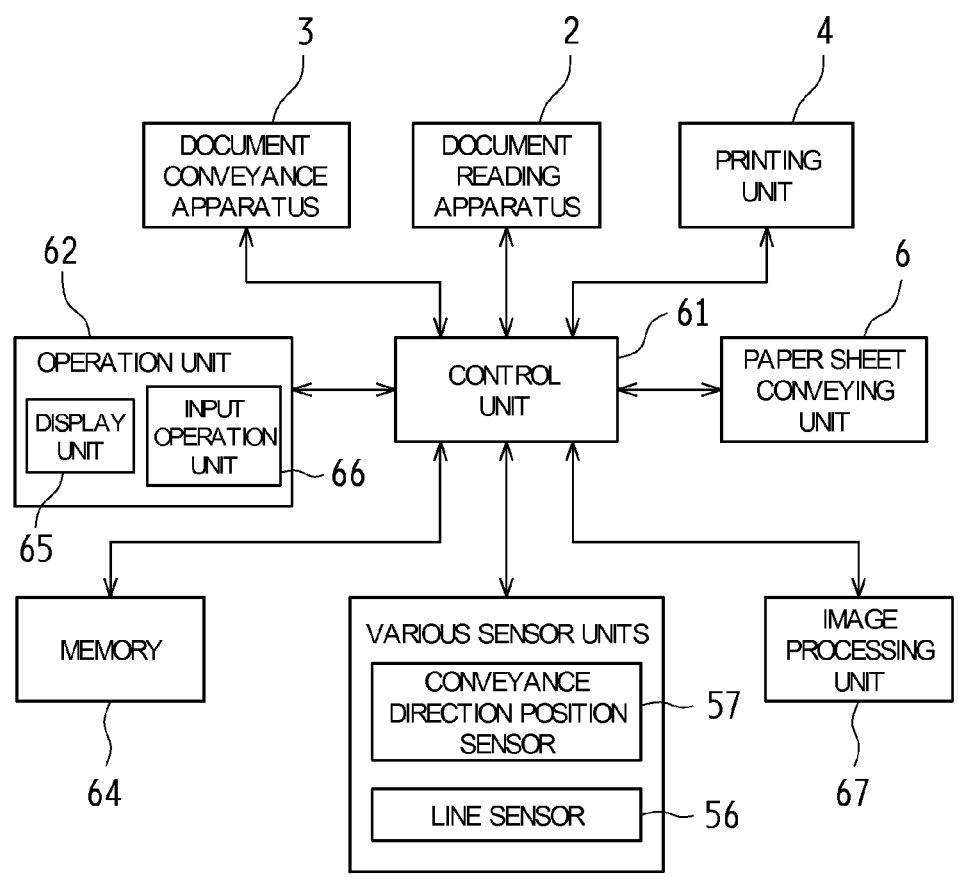
FIG. 3 is a block diagram illustrating a configuration of a control system of the image forming apparatus in FIG. 1.

FIG. 3 is a block diagram illustrating a configuration of a control system of the image forming apparatus 1. In FIG. 3, a control unit 61 controls the document conveyance apparatus 3, the document reading apparatus 2, the printing unit 4, the paper sheet conveying unit 6, or a similar apparatus or unit and inputs detection outputs from the line sensor 56 and the conveyance direction paper sheet sensor 57 to obtain the conveyance position of the recording paper sheet.

An operation panel 62 includes a display unit 65 and an input operation unit 66. The display unit 65 is configured by a liquid crystal display or a similar apparatus. The input operation unit 66 is configured by a plurality of operation keys, a touch panel superimposed to a screen of the display unit 65, or a similar part. The operation panel 62 displays an operational guidance of the image forming apparatus 1 or a similar message on a screen of the display unit 65 and outputs an instruction, data, or similar information input by operating the input operation unit 66 to the control unit 61.

A memory 64 stores various control information required to control respective driving mechanism units, which configure the image forming apparatus 1, and stores logs of the paper sheet conveyance position, which are detected by the conveyance direction paper sheet sensor 57 and the line sensor 56. An image processing unit 67 performs various image processing on image data.

For example, the control unit 61 causes the document reading apparatus 2 to read an image on a document and causes the memory 64 to store the image data indicative of the image on the document. Further, the control unit 61 causes the image processing unit 67 to process the image data in the memory 64, and causes the printing unit 4 to record the image on the document indicated by the image data in the memory 64 on the recording paper sheet.

The control unit 61 also obtains a displacement amount of the recording paper sheet in the main-scanning direction based on the side edge position of the recording paper sheet in the main-scanning direction, which is detected by the line sensor 56. Using this displacement amount, the control unit 61 corrects the image formation position(s) of the toner image(s) in the main-scanning direction on the plurality of or the single photosensitive drum(s) 13, and corrects the printing position(s) of the toner image(s) in the main-scanning direction on the recording paper sheet.

Further, the control unit 61 obtains time from the starting time point of conveying the recording paper sheet by the respective registration rollers 34 until the time point of detecting the top edge of the recording paper sheet by the conveyance direction paper sheet sensor 57. Based on this time, the displacement amount of the recording paper sheet in the sub-scanning direction is obtained. Using this displacement amount, the image formation position(s) of the toner image(s) in the sub-scanning direction on the plurality of or the single photosensitive drum(s) 13 is/are corrected, and the printing position(s) of the toner image(s) in the sub-scanning direction on the recording paper sheet is/are corrected.

The following describes the correction method for the printing position of the toner image in the image forming apparatus 1 in detail. The image forming apparatus 1 preliminary prepares a real-time correction, a most recent prediction correction, and an all-average-value prediction correction as correction methods for correcting the printing position of the toner image in the main-scanning direction on the recording paper sheet and selectively uses these corrections. The memory 64 preliminary stores procedures for these corrections. The control unit 61 reads out the procedures from the memory 64 for execution. All the real-time correction, the most recent prediction correction, and the all-average-value prediction correction correct the image formation position(s) on the plurality of or the single photosensitive drum(s) 13 in a similar procedure. The procedures for the real-time correction, the most recent prediction correction, and the all-average-value prediction correction are as follows.

[Real-Time Correction]

Figure 4:
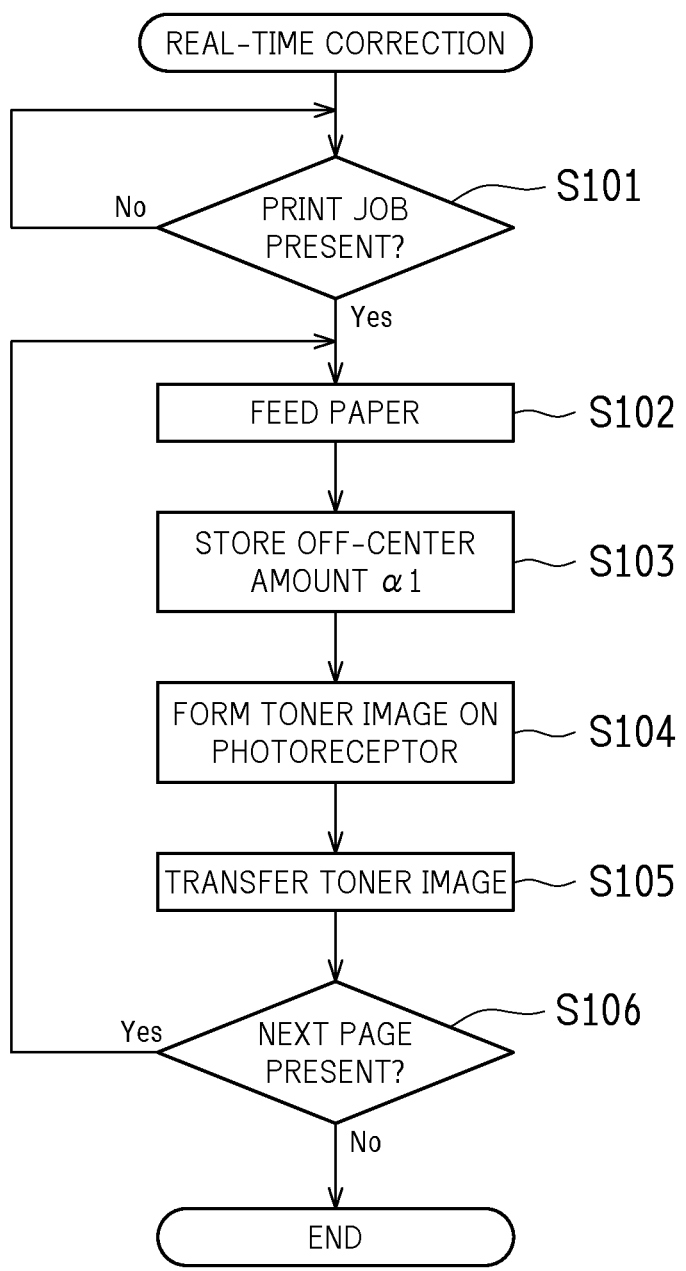
FIG. 4 is a flowchart illustrating a procedure of a real-time correction to correct an image formation position on a photosensitive drum in the image forming apparatus in FIG. 1.

FIG. 4 is a flowchart illustrating a procedure for the real-time correction. First, when the control unit 61 receives a print job request by the operation to the operation panel 62 (Yes at Step S101), the control unit 61 feeds the first recording paper sheet from the sheet feed cassette 5 (Step S102). The control unit 61 brings the top edge of the recording paper sheet in contact with the respective registration rollers 34 to once stop the recording paper sheet. At this time, the control unit 61 obtains an off-center amount (displacement amount) $\alpha 1$ based on the conveyance position of the first recording paper sheet in the main-scanning direction, which is detected by the line sensor 56, and causes the memory 64 to store the off-center amount $\alpha 1$ (Step S103). Then, the control unit 61 decides a correction amount of the image formation position on the photosensitive drum 13 based on the off-center amount $\alpha 1$. The control unit 61 forms the toner image at the corrected image formation position on the photosensitive drum 13 (Step S104).

For example, as illustrated in FIG. 5A, a reference adjustment amount of the image formation position on the photosensitive drum 13 (an adjustment amount with respect to an initial position) is denoted as $\beta o$, and a reference position of the side edge of the recording paper sheet is denoted as $\alpha o$. In the case where the recording paper sheet (illustrated by alternate long and short dash lines) is conveyed in the paper sheet conveyance direction E with its position displaced to a preset center position F, the displacement amount of the side edge position from the reference position $\alpha o$ is obtained as the off-center amount $\alpha 1$ and is stored in the memory 64. Further, as illustrated in FIG. 5B, the image formation position on the photosensitive drum 13 is corrected such that the image formation position of a toner image 90 on the photosensitive drum 13 and the paper sheet conveyance position of the recording paper sheet stopped by the respective registration rollers 34 match (matched with the alternate long and short dash lines). Then, the toner image is formed at the corrected image formation position on the photosensitive drum 13. A correction amount $\beta 1$ of the image formation position is obtained by $\beta 1 = \beta o + \alpha 1$.

After this, the control unit 61 obtains the starting time point of conveying the recording paper sheet by the respective registration rollers 34 based on the image formation position on the photosensitive drum 13. The control unit 61 starts conveying the recording paper sheet at this conveyance starting time point and transfers the toner image on the first recording paper sheet at the nip region N between the intermediate transfer belt 21 and the transfer roller 23a (Step S105).

Hereinafter, the control unit 61 checks whether the next recording paper sheet to be printed is present or not (Step S106), when the next recording paper sheet to be printed is present ("Yes" at Step S106), the processes from Step S102 are repeated. If the next recording paper sheet to be printed is absent ("No" at Step S106), the processes in FIG. 4 are terminated.

That is, the real-time correction is the following correction method. The real-time correction detects the side edge position of the recording paper sheet in the main-scanning direction by the line sensor 56 and obtains the displacement amount of the recording paper sheet in the main-scanning direction. Then, using this displacement amount, the image formation position(s) of the toner image(s) in the main-scanning direction on the plurality of or the single photosensitive drum(s) 13 is/are corrected. The real-time correction starts conveying the recording paper sheet by the respective registration rollers 34 and transfers the toner image on the recording paper sheet at the nip region N between the intermediate transfer belt 21 and the intermediate transfer roller 23a. The real-time correction is a correction method that obtains the displacement amount of the recording paper sheet in the main-scanning direction for each recording paper sheet to correct the printing position of the toner image in the main-scanning direction. In view of this, the printing position of the toner image in the main-scanning direction on the recording paper sheet is maintained at high accuracy. However, after detecting the side edge position of the recording paper sheet in the main-scanning direction by the line sensor 56 and obtaining the displacement amount of the recording paper sheet in the main-scanning direction, an operation of forming the toner image(s) on the plurality of or the single photosensitive drum(s) 13 is started. This lengthens time for image formation for each recording paper sheet, reducing the number of printed sheets per unit time.

With the image forming apparatus 1 in FIG. 1, after the line sensor 56 detects the side edge position of the recording paper sheet in the main-scanning direction, the toner image(s) is/are formed on the plurality of or the single photosensitive drum(s) 13 and the toner image(s) is/are transferred to the intermediate transfer belt 21. Further, the toner image(s) is/are transferred on the recording paper sheet at the nip region N between the intermediate transfer belt 21 and the transfer roller 23a. Matching a transfer timing to the recording paper sheet, the recording paper sheet is started to be conveyed with the respective registration rollers 34. Therefore, from the time point of detection by the line sensor 56 until immediately before the toner image on the intermediate transfer belt 21 reaching the nip region N, conveyance of the recording paper sheet by the respective registration rollers 34 needs to stand by. This lengthens the image formation time for each recording paper sheet and reduces the number of printed sheets per unit time.

In particular, moving time (moving distance) of a yellow toner image from the photosensitive drum 13 in the image formation station Pd to the nip region N via the intermediate transfer belt 21 is long. In view of this, in the case of color image, from the time point of detection by the line sensor 56 until immediately before the yellow toner image reaching the nip region N, the conveyance of the recording paper sheet by the respective registration rollers 34 needs to stand by. This tremendously lengthens the image formation time and the number of printed sheets per unit time is also tremendously reduced.

Moving time (moving distance) of a black toner image from the photosensitive drum 13 in the image formation station Pa to the nip region N via the intermediate transfer belt 21 is short. In view of this, in the case of monochrome image, from the time point of detection by the line sensor 56 until immediately before the black toner image reaching the nip region N, even if the conveyance of the recording paper sheet by the respective registration rollers 34 stands by, compared with the case of color image, this shortens the image formation time for each recording paper sheet and also increases the number of printed sheets per unit time.

[Most Recent Prediction Correction]

Figure 6:
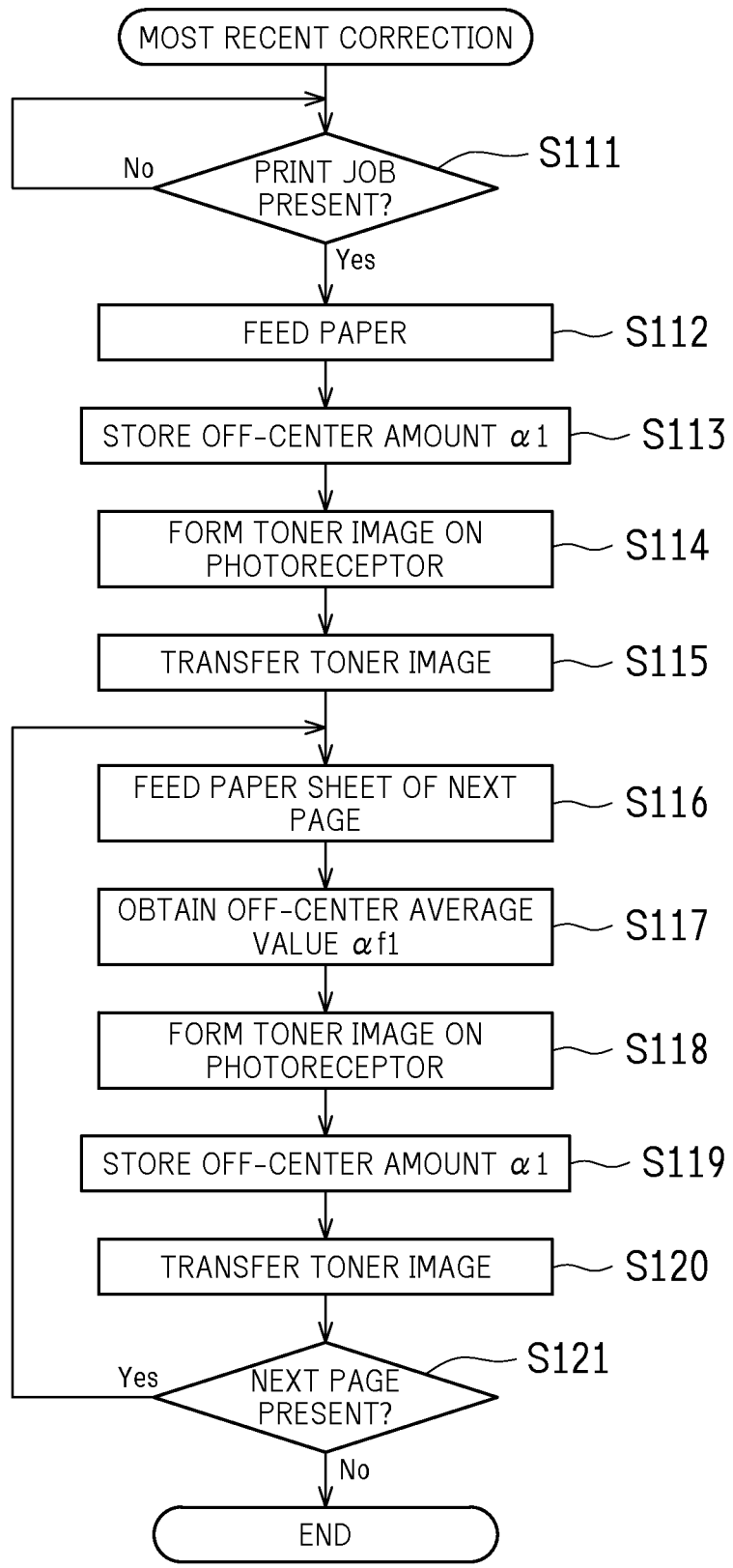
FIG. 6 is a flowchart illustrating a procedure for a most recent prediction correction to correct the image formation position on the photosensitive drum in the image forming apparatus in FIG. 1.

FIG. 6 is a flowchart illustrating a procedure for the most recent prediction correction. First, when the control unit 61 receives the print job request by the operation to the operation panel 62 (Yes at Step S111), the control unit 61 feeds the first recording paper sheet from the sheet feed cassette 5 (Step S112). The control unit 61 brings the top edge of the recording paper sheet in contact with the respective registration rollers 34 to once stop the recording paper sheet. At this time, the control unit 61 detects the conveyance position of the first recording paper sheet in the main-scanning direction by the line sensor 56 to obtain the off-center amount (displacement amount) $\alpha 1$, and causes the memory 64 to store the off-center amount $\alpha 1$ (Step S113). Then, the control unit 61 obtains the correction amount $\beta 1$ of the image formation position on the photosensitive drum 13 based on the off-center amount $\alpha 1$ to correct the image formation position on the photosensitive drum 13. The control unit 61 forms the toner image at the corrected image formation position on the photosensitive drum 13 (Step S114).

After this, the control unit 61 obtains the starting time point of conveying the recording paper sheet by the respective registration rollers 34 based on the image formation position on the photosensitive drum 13. The control unit 61 starts conveying the recording paper sheet at this conveyance starting time point and transfers the toner image on the first recording paper sheet at the nip region N between the intermediate transfer belt 21 and the transfer roller 23a (Step S115).

Next, the control unit 61 starts feeding a second recording paper sheet from the sheet feed cassette 5 (Step S116). Then, the control unit 61 obtains an off-center average value $\alpha f1$ ($=\alpha 1$), which is an average value of the off-center amount $\alpha 1$ of the previous recording paper sheet (the first recording paper sheet) (Step S117). The control unit 61 obtains the correction amount $\beta 31$ based on the off-center average value $\alpha f1$ to correct the image formation position on the photosensitive drum 13. Then, the control unit 61 forms the toner image at the corrected image formation position on the photosensitive drum 13 (Step S118).

The control unit 61 brings the top edge of the second recording paper sheet in contact with the respective registration rollers 34 to once stop the second recording paper sheet. The line sensor 56 detects the conveyance position of the recording paper sheet in the main-scanning direction. The control unit 61 obtains the off-center amount (the displacement amount) $\alpha 1$ and causes the memory 64 to store the off-center amount $\alpha 1$ (Step S119).

After this, the control unit 61 obtains the starting time point of conveying the recording paper sheet by the respective registration rollers 34 based on the image formation position on the photosensitive drum 13. The control unit 61 starts conveying the second recording paper sheet at this conveyance starting time point and transfers the toner image on the recording paper sheet at the nip region N between the intermediate transfer belt 21 and the transfer roller 23a (Step S120).

Subsequently, the control unit 61 checks whether the third recording paper sheet to be printed is present or not (Step S121), when the next recording paper sheet to be printed is present ("Yes" at Step S121), the processes from Step S116 are repeated. Therefore, the control unit 61 starts feeding the recording paper sheet from the sheet feed cassette 5 (Step S116). Then, the control unit 61 obtains the off-center average value $\alpha f1$, which is the average value of the off-center amounts $\alpha 1$ of previous (the first and second) recording paper sheets (Step S117). The control unit 61 obtains the correction amount $\beta 1$ based on the off-center average value $\alpha f1$ to correct the image formation position on the photosensitive drum 13. Then, the control unit 61 forms the toner image at the corrected image formation position on the photosensitive drum 13 (Step S118). The control unit 61 brings the top edge of the third recording paper sheet in contact with the respective registration rollers 34 to once stop the third recording paper sheet. The line sensor 56 detects the conveyance position of the recording paper sheet in the main-scanning direction. The control unit 61 obtains the off-center amount $\alpha 1$ and causes the memory 64 to store the off-center amount $\alpha 1$ (Step S119). The control unit 61 starts conveying the third recording paper sheet by the respective registration rollers 34 and transfers the toner image on the recording paper sheet at the nip region N between the intermediate transfer belt 21 and the transfer roller 23a (Step S120).

Hereinafter, similarly, when the next recording paper sheet to be printed is present ("Yes" at Step S121), the processes from Steps S116 to S120 are repeated. If the next recording paper sheet to be printed is absent ("No" at Step S121), the processes in FIG. 6 are terminated.

That is, the most recent prediction correction corrects the first recording paper sheet similar to the real-time correction for continuous printing of the plurality of recording paper sheets. Regarding the second recording paper sheet, the most recent prediction correction corrects the image formation position(s) of the toner image(s) in the main-scanning direction on the plurality of or the single photosensitive drum(s) 13 using the displacement amount of the first recording paper sheet in the main-scanning direction. Regarding the third and later recording paper sheets, this correction method corrects the image formation position(s) of the toner image(s) in the main-scanning direction on the plurality of or the single photosensitive drum(s) 13 using the average value of the displacement amounts of previous recording paper sheets in the main-scanning direction. In view of this, the image formation time of the first recording paper sheet becomes long similar to the real-time correction. However, regarding the second and later recording paper sheets, before the line sensor 56 detects the side edge position of the recording paper sheet in the main-scanning direction (or is not restricted by the detection), the operation of forming the toner image(s) on the plurality of or the single photosensitive drum(s) 13 can be started. Accordingly, the image formation time for each recording paper sheet is the shortest time same as the case where the image formation position in the main-scanning direction is not corrected. This increases the number of printed sheets per unit time.

With the image forming apparatus 1 in FIG. 1, regarding the second and later recording paper sheets, preceding the time point of detection of the side edge position of the recording paper sheet in the main-scanning direction by the line sensor 56, the toner image(s) is/are formed on the plurality of or the single photosensitive drum(s) 13, and the toner image(s) is/are transferred to the intermediate transfer belt 21. This allows bringing forward the starting time point of conveying the recording paper sheet by the respective registration rollers 34. Therefore, compared with the real-time correction, this shortens the image formation time for each recording paper sheet and also increases the number of printed sheets per unit time.

In the comparison between the color image and the monochrome image, when printing the first recording paper sheet, a difference similar to the real-time correction occurs, and the image formation time of the color image becomes substantially longer than the image formation time of the monochrome image. However, in the case of printing the second and later recording paper sheets, a difference between the image formation time of the color image and the image formation time of the monochrome image is reduced, also reducing a difference in the number of printed sheets per unit time.

[All-Average-Value Prediction Correction]

Figure 7:
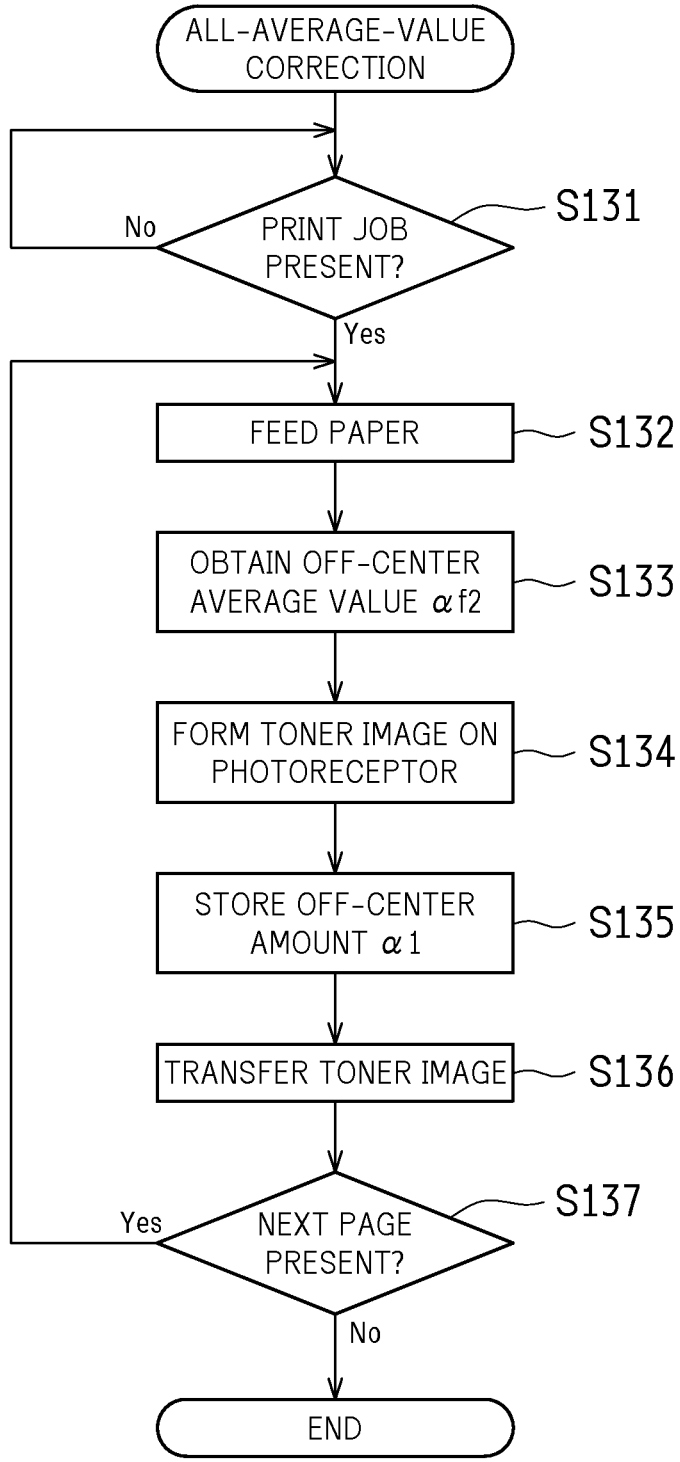
FIG. 7 is a flowchart illustrating a procedure for an all-average-value prediction correction to correct the image formation position on the photosensitive drum in the image forming apparatus in FIG. 1.

FIG. 7 is a flowchart illustrating the procedure for the all-average-value prediction correction. First, when the control unit 61 receives the print job request by the operation to the operation panel 62 (Yes at Step S131), the control unit 61 starts feeding the recording paper sheet from the sheet feed cassette 5 (Step S132). Then, the control unit 61 reads out an off-center average value $\alpha f2$, which is an average value of all the off-center amounts $\alpha 1$ obtained from the certain number of respective past print jobs from the memory 64 (Step S133). Based on the off-center average value $\alpha f2$, the control unit 61 obtains the correction amount $\beta 1$ to correct the image formation position on the photosensitive drum 13. Then, the control unit 61 forms the toner image at the corrected image formation position on the photosensitive drum 13 (Step S134). The off-center average value $\alpha f2$ is obtained by averaging the all off-center amounts $\alpha 1$ obtained from the certain number of respective past print jobs whenever the print job is terminated and is stored and updated in the memory 64.

The control unit 61 brings the top edge of the recording paper sheet in contact with the respective registration rollers 34 to once stop the recording paper sheet. The line sensor 56 detects the conveyance position of the recording paper sheet in the main-scanning direction. The control unit 61 obtains the off-center amount (the displacement amount) $\alpha 1$ and causes the memory 64 to store the off-center amount $\alpha 1$ of the print job of this time (Step S135).

After this, the control unit 61 obtains the starting time point of conveying the recording paper sheet by the respective registration rollers 34 based on the image formation position on the photosensitive drum 13. The control unit 61 starts conveying this recording paper sheet and transfers the toner image on the recording paper sheet at the nip region N between the intermediate transfer belt 21 and the transfer roller 23a (Step S136).

Hereinafter, the control unit 61 checks whether the next recording paper sheet to be printed is present or not (Step S137), when the next recording paper sheet to be printed is present ("Yes" at Step S137), the processes from Step S132 are repeated. If the next recording paper sheet to be printed is absent ("No" at Step S137), the processes in FIG. 7 are terminated.

That is, whenever the print job is performed, the all-average-value prediction correction detects the side edge position of each recording paper sheet in the main-scanning scanning direction by the line sensor 56 and obtains and stores the displacement amount of each recording paper sheet in the main-scanning direction. Whenever the print job is performed, the all-average-value prediction correction uses the average value of the all displacement amounts obtained from the certain number of respective past print jobs to correct the image formation position(s) of the toner image(s) in the main-scanning direction on the plurality of or the single photosensitive drum(s) 13. In view of this, similar to the second and later recording paper sheets in the most recent prediction correction, before the line sensor 56 detects the side edge position of the recording paper sheet in the main-scanning direction (or is not restricted by the detection), the all-average-value prediction correction can start the operation of forming the toner image(s) on the plurality of or the single photosensitive drum(s) 13. Accordingly, the image formation time for each recording paper sheet is the shortest time same as the case where the image formation position in the main-scanning direction is not corrected. This increases the number of printed sheets per unit time. In the comparison between the color image and the monochrome image, the difference in the image formation time is small, and the difference in the number of printed sheets per unit time is also small.

The following describes the correction method for correcting the printing position of the toner image in the sub-scanning direction on the recording paper sheet. The image forming apparatus 1 uses one kind of correction method to correct the printing position in the sub-scanning direction. The memory 64 preliminary stores a procedure for this correction. The control unit 61 reads out the procedure from the memory 64 for execution. The correction in the sub-scanning direction can be performed concurrently with any of the real-time correction, the most recent prediction correction, and the all-average-value prediction correction in the main-scanning direction.

The correction method for the printing position in the sub-scanning direction is as follows. Whenever the print job is performed, this method obtains time from the starting time point of conveying the recording paper sheet by the respective registration rollers 34 until the time point of detection of the top edge of the recording paper sheet by the conveyance direction paper sheet sensor 57, and obtains the displacement amount of the recording paper sheet in the sub-scanning direction based on this time and stores the displacement amount. Additionally, whenever the print job is performed, this method uses the average value of the all displacement amounts obtained from the certain number of respective past print jobs to correct the image formation position(s) of the toner image(s) in the sub-scanning direction on the plurality of or the single photosensitive drum(s) 13. In view of this, before the conveyance direction paper sheet sensor 57 detects the side edge position of the recording paper sheet (or is not restricted by the detection), this correction can start the operation of forming the toner image(s) on the plurality of or the single photosensitive drum(s) 13. Accordingly, the image formation time for each recording paper sheet is the shortest time same as the case where the image formation position in the sub-scanning direction is not corrected. These dos not reduce the number of printed sheets per unit time. In the comparison between the color image and the monochrome image, the difference in the image formation time is small, and the difference in the number of printed sheets per unit time is also small. Further, this correction method does not affect any of the real-time correction, the most recent prediction correction, and the all-average-value prediction correction in the main-scanning direction at all.

The image forming apparatus 1 applies the real-time correction, the most recent prediction correction, and the all-average-value prediction correction appropriately in combination to the printing position in the main-scanning direction for the color image and the monochrome image. Corresponding to these combinations, the image forming apparatus 1 can selectively set a first correction mode of a first embodiment, a second correction mode of a second embodiment, a third correction mode of a third embodiment, and a fourth correction mode of a fourth embodiment. The image forming apparatus 1 can also switch and set the one kind of the correction method for the printing position in the sub-scanning direction to be enabled or disabled.

FIG. 8 is drawings and tables illustrating the first to fourth correction modes. As illustrated in the drawings and tables in FIG. 8, the first correction mode of the first embodiment applies the all-average-value prediction correction to the color image and applies the real-time correction to the monochrome image. The second correction mode of the second embodiment applies the all-average-value prediction correction to both the color image and the monochrome image. Further, the third correction mode of the third embodiment applies the real-time correction to both the color image and the monochrome image. The fourth correction mode of the fourth embodiment applies the most recent prediction correction to both the color image and the monochrome image.

The first to the fourth correction modes for the printing position in the main-scanning direction are set by the input operation to the operation panel 62. The setting for switching enabling or disabling the one kind of correction method on the printing position in the sub-scanning direction is also set by the input operation to the operation panel 62.

Figure 9:
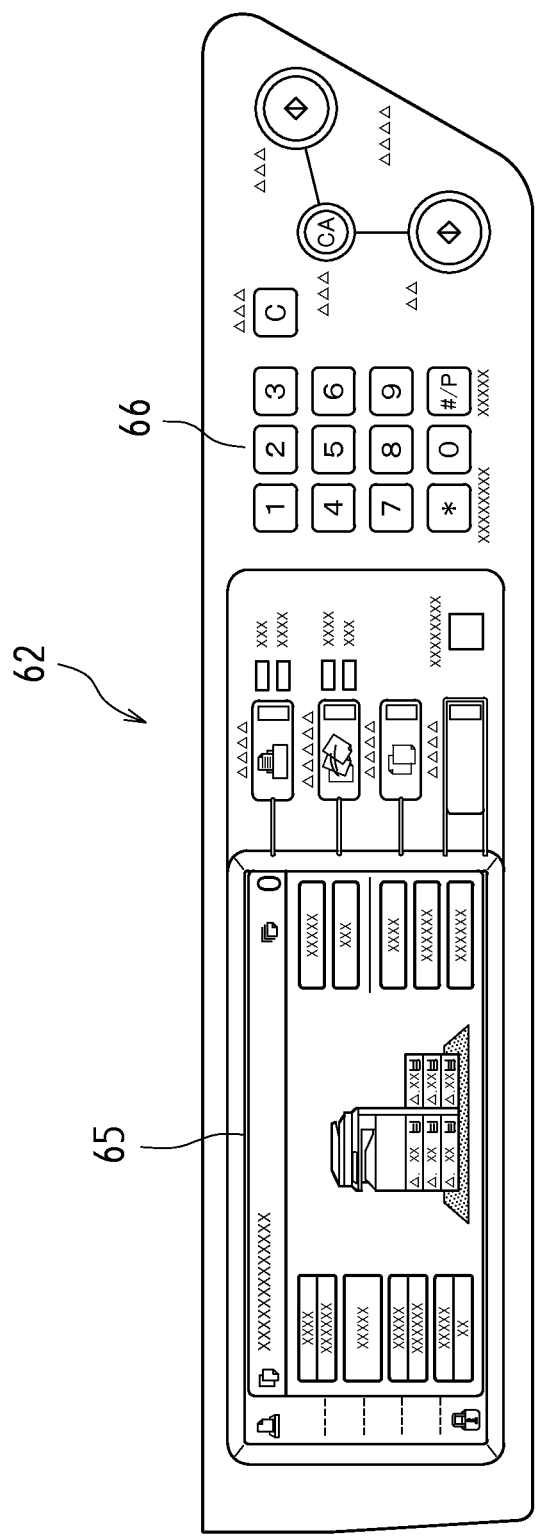
FIG. 9 is a plan view illustrating an operation panel in the image forming apparatus in FIG. 1.

FIG. 9 is a plan view illustrating the operation panel 62. As illustrated in FIG. 9, the operation panel 62 includes the display unit 65 and the input operation unit 66. The display unit 65 is configured by the liquid crystal display or a similar apparatus. The input operation unit 66 is configured by the plurality of operation keys, the touch panel superimposed to the screen of the display unit 65, or a similar part. The operation panel 62 notifies the control unit 61 of the display button (the display region) detected by the operated key and touch panel. In response to this, the control unit 61 switches the screen of the display unit 65 and controls the image forming apparatus 1.

Figure 10:
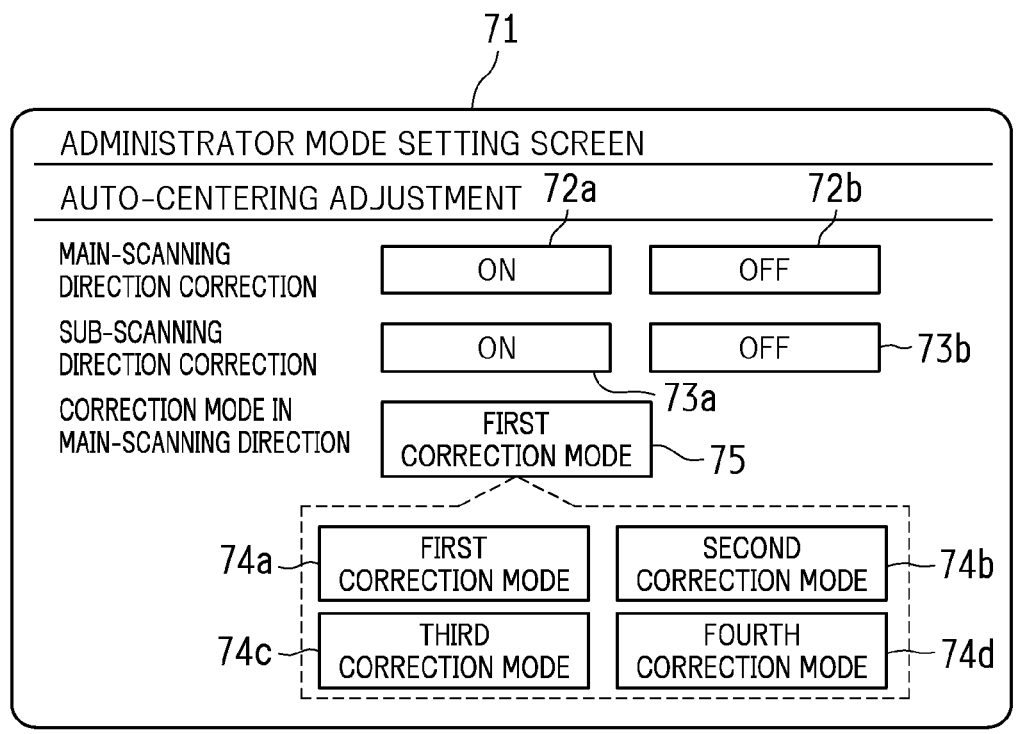
FIG. 10 is a drawing illustrating a setting screen in an administrator mode displayed at a display unit of the operation panel.

When selectively setting the first to fourth correction modes, the administrator mode is set by the input operation to the plurality of operation keys, the touch panel superimposed to the screen of the display unit 65, or a similar part. In response to this, the control unit 61 causes a setting screen 71 in the administrator mode, which is as illustrated in FIG. 10, to pop up on the display unit 65. A user operates any of respective display buttons 72a and 72b. The display buttons 72a and 72b instruct whether to correct the printing position in the main-scanning direction or not. For example, when operating the display button 72b, the correction of the printing position in the main-scanning direction is disabled; therefore, all of the first to fourth correction modes cannot be set. When operating the display button 72a, the correction of the printing position in the main-scanning direction is enabled. Subsequently, when selectively operating any of respective display buttons 74a to 74d, any of the first to fourth correction modes is displayed at a display button 75, and the mode displayed at the display button 75 becomes enabled.

For example, when operating the display button 72a, the correction of the printing position in the main-scanning direction becomes enabled, and subsequently, when operating the display button 74a, the first correction mode is displayed at the display button 75 and becomes enabled. When operating the display button 72a and subsequently operating the display button 74b, the second correction mode is displayed at the display button 75 and becomes enabled. Further, when operating the display button 72a and subsequently operating the display button 74c, the third correction mode is displayed at the display button 75 and becomes enabled. When operating the display button 72a and subsequently operating the display button 74d, the fourth correction mode is displayed at the display button 75 and becomes enabled.

The user operates any of respective display buttons 73a and 73b to instruct whether to correct the printing position in the sub-scanning direction or not to set the correction of the printing position in the sub-scanning direction to be enabled or disabled. Regardless of whether the correction of the printing position in the main-scanning direction is enabled or disabled, when operating any of the respective display buttons 73a and 73b, the correction of the printing position in the sub-scanning direction becomes enabled or disabled.

Thus, the corrections of the printing position in the main-scanning direction and in the sub-scanning direction can be enabled or disabled, when enabling the correction of the printing position in the main-scanning direction, any of the first to the fourth correction modes can be selected and set.

When disabling the corrections of the printing position in the main-scanning direction and in the sub-scanning direction, the control unit 61 does not correct the printing position. When enabling the correction of the printing position in the main-scanning direction and selecting the first correction mode, the control unit 61 corrects the printing position for color image based on the all-average-value prediction correction, and corrects the printing position for monochrome image based on the real-time correction. Further, when enabling the correction of the printing position in the main-scanning direction and selecting the second correction mode, the control unit 61 corrects the printing position for both color image and monochrome image based on the all-average-value prediction correction. When enabling the correction of the printing position in the main-scanning direction and selecting the third correction mode, the control unit 61 corrects the printing position for both color image and monochrome image based on the real-time correction. Further, when enabling the correction of the printing position in the main-scanning direction and selecting the fourth correction mode, the control unit 61 corrects the printing position for both color image and monochrome image based on the most recent prediction correction. When enabling the correction of the printing position in the sub-scanning direction, the control unit 61 corrects the printing position in the sub-scanning direction for both color image and monochrome image.

The following describes the uses of the first correction mode of the first embodiment, the second correction mode of the second embodiment, the third correction mode of the third embodiment, and the fourth correction mode of the fourth embodiment according to the need. First, the first correction mode of the first embodiment applies the all-average-value prediction correction to the color image and applies the real-time correction to the monochrome image according to the need.

The all-average-value prediction correction uses the average value of all the displacement amounts obtained from the certain number of respective past print jobs to correct the image formation position of the toner image(s) in the main-scanning direction on the plurality of or the single photosensitive drum(s) 13. Accordingly, the all-average-value prediction correction allows starting the operation of forming the toner image(s) on the plurality of or the single photosensitive drum(s) 13 before the detection of the side edge position of the recording paper sheet in the main-scanning direction by the line sensor 56 (or is not restricted by the detection). The image formation time for each recording paper sheet is the shortest time same as the case where the image formation position in the main-scanning direction is not corrected; therefore, the number of printed sheets per unit time does not reduce. Therefore, assume the case where the number of printed sheets per unit time when the image formation position in the main-scanning direction is not corrected is 100%. In the case of color image, even if the all-average-value prediction correction is performed, the number of printed sheets per unit time is maintained at 100%. Accordingly, copy performance (CPM) is not degraded.

The real-time correction detects the side edge position of the recording paper sheet in the main-scanning direction by the line sensor 56 to obtain the displacement amount of the recording paper sheet in the main-scanning direction and then starts the operation of forming the toner image(s) on the plurality of or the single photosensitive drum(s) 13. Accordingly, the printing position of the toner image in the main-scanning direction on the recording paper sheet is maintained at high accuracy. However, the image formation time for each recording paper sheet lengthens, reducing the number of printed sheets per unit time. Therefore, assume the case where the number of printed sheets per unit time when the image formation position in the main-scanning direction is not corrected is 100%. In the case of monochrome image, for example, the number of printed sheets per unit time becomes 70% by performing the real-time correction, resulting in deterioration of the CPM.

Therefore, when setting the first correction mode, the CPM is not degraded regarding the color image. Regarding the monochrome image, the CPM is degraded, but the printing position in the main-scanning direction on the recording paper sheet is maintained at high accuracy.

With the first correction mode, the CPM of the monochrome image remains at a reduction of 70%. Accordingly, in the case where the reduction of CPM to that extent is acceptable, the first correction mode is selected and set. In the comparison between the monochrome image and the color image, the number of printed sheets per unit time with the CPM of 100% of the monochrome image is larger than that of color image. Accordingly, even if the CPM for the monochrome image is degraded to 70%, the reduction in the CPM is less likely to be recognized.

Next, since the second correction mode of the second embodiment applies the all-average-value prediction correction to the color image and the monochrome image, the CPM does not degrade for both the color image and the monochrome image.

In view of this, in both the color image and the monochrome image, to prioritize the CPM over the accuracy of the printing position in the main-scanning direction on the recording paper sheet, the second correction mode is selected and set.

Next, since the third correction mode of the third embodiment applies the real-time correction to the color image and the monochrome image, the printing position in the main-scanning direction on the recording paper sheet is maintained at high accuracy, but the CPM degrades. Assume the case where the number of printed sheets per unit time when the image formation position in the main-scanning direction is not corrected is 100%. In the case of color image, for example, the number of printed sheets per unit time becomes 50% by performing the real-time correction, resulting in tremendous deterioration of the CPM. In the case of monochrome image, for example, the number of printed sheets per unit time becomes 70% by performing the real-time correction, resulting in deterioration of the CPM.

In view of this, in both the color image and the monochrome image, to prioritize the accuracy of the printing position in the main-scanning direction on the recording paper sheet over the CPM, the third correction mode is selected and set.

Next, the fourth correction mode of the fourth embodiment applies the most recent prediction correction to the color image and the monochrome image. The most recent prediction correction lengthens the image formation time of the first recording paper sheet similar to the real-time correction. However, almost similar to the all-average-value prediction correction, regarding the second and later recording paper sheets, before the line sensor 56 detects the side edge position of the recording paper sheet in the main-scanning direction (or is not restricted by the detection), the operation of forming the toner image(s) on the plurality of or the single photosensitive drum(s) 13 can be started. Accordingly, the CPM does not degrade.

For example, when exchanging or switching and using the plurality of sheet feed cassettes 5 frequently, whenever the sheet feed cassettes 5 are exchanged and switched, the displacement amount of the recording paper sheet possibility changes. In this case, since the most recent prediction correction is considered to be effective compared with the all-average-value prediction correction, the fourth correction mode is selected and set.

Thus, since the image forming apparatus 1 can select and set the first to fourth correction modes, ensuring improving ease of use. In particular, with the first reading mode, the CPM for color image does not degrade. Furthermore, although the CPM for monochrome image degrades, the reduction of the CPM remains at 70%. This is less likely to feel the reduction in the CPM for the monochrome image, and the image formation position in the main-scanning direction for monochrome image is maintained at high accuracy.

The following describes other embodiments of the image forming apparatus of the present invention. The image forming apparatus of other embodiments employs the following correction method. The recording paper sheet is moved in the main-scanning direction to change the position of the recording paper sheet in the main-scanning direction. This corrects the printing position of the toner image in the main-scanning direction on the recording paper sheet. To move the recording paper sheet in the main-scanning direction, instead of the respective registration rollers 34 in the image forming apparatus 1 in FIG. 1, a registration unit is disposed, and a configuration near the registration unit is changed. However, at a part excluding the neighborhood of the registration unit, the embodiments employ the configuration similar to the image forming apparatus in FIG. 1. Alternatively, such correction method and the correction method for correcting the printing position of the toner image in the main-scanning direction on the recording paper sheet by changing the image shape position of the toner image in the main-scanning direction on the photosensitive drum 13, similar to the image forming apparatus 1 in FIG. 1, are selectively used.

Figure 11:
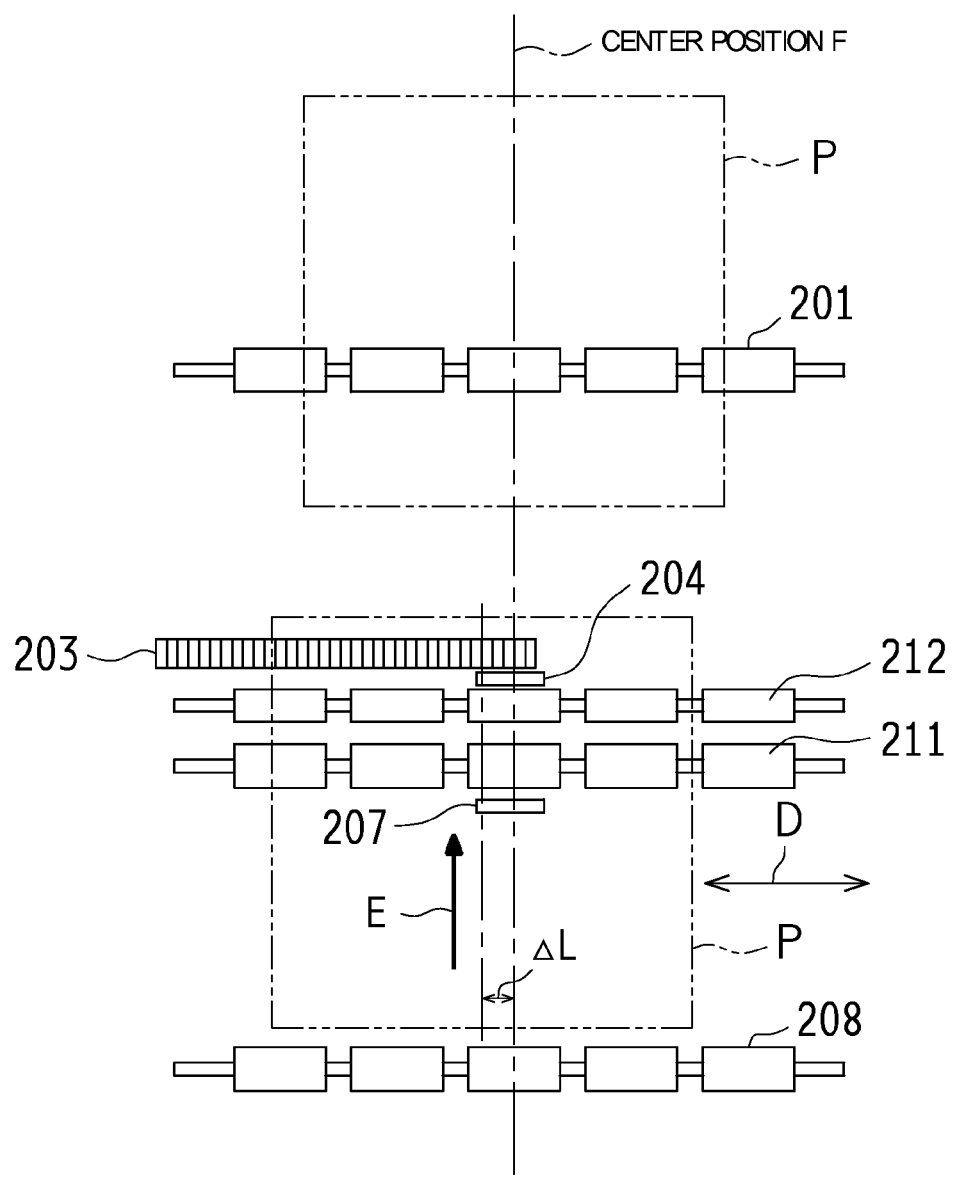
FIG. 11 is a plan view illustrating an enlarged configuration near a registration unit of an image forming apparatus of another embodiment of the present invention.
Figure 12:
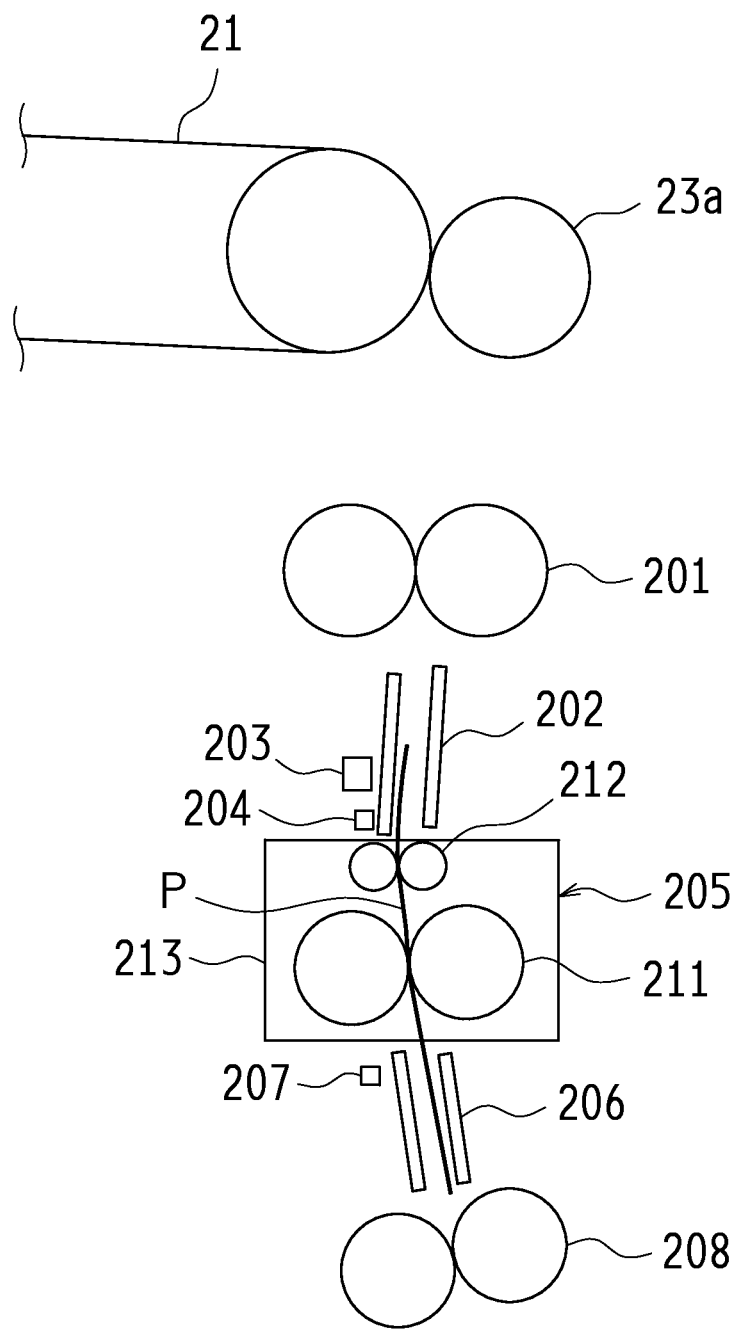
FIG. 12 is an enlarged side view of the configuration near the registration unit in FIG. 11.

FIG. 11 and FIG. 12 are a plan view and a side view illustrating an enlarged configuration near the registration unit of the image forming apparatus of another embodiment. In FIG. 11 and FIG. 12, at the upstream side with respect to the nip region between the intermediate transfer belt 21 and the transfer roller 23a in the paper sheet conveying direction, each downstream side conveyance roller 201, each downstream side guide member 202, a line sensor 203, a downstream side paper sheet sensor 204, a registration unit 205, each upstream side guide member 206, an upstream side paper sheet sensor 207, and each upstream side conveyance roller 208 are disposed. Further, at the upstream side with respect to each upstream side conveyance roller 208 in the paper sheet conveying direction, each conveyance roller 35, which is illustrated in FIG. 1, is disposed. The registration unit 205 includes each registration roller 211, each skew correction roller 212, a moving frame 213, or a similar part. The moving frame 213 supports these respective rollers 211 and 212.

Here, the recording paper sheet is sequentially conveyed by the respective conveyance rollers 35 (illustrated in FIG. 1)

and the respective upstream side conveyance rollers 208, passes through between the respective upstream side guide members 206, and is conveyed to the registration unit 205. Then, the top edge of a recording paper sheet P is struck against each temporarily stopped registration roller 211, and the top edge of the recording paper sheet P is aligned parallel to each registration roller 211. Subsequently, the recording paper sheet P is conveyed by the respective upstream side conveyance rollers 208 and the respective registration rollers 211. The top edge of the recording paper sheet P is struck against each temporarily stopped skew correction roller 212, and the top edge of the recording paper sheet P is aligned parallel to each skew correction roller 212. Therefore, the top edge of the recording paper sheet P is struck against each registration roller 211 and each skew correction roller 212 twice, and is aligned parallel to the rollers 211 and 212.

Further, the respective registration rollers 211 and the respective skew correction rollers 212 convey the recording paper sheet P. Immediately after the top edge of the recording paper sheet P passes through the line sensor 203, the line sensor 203 detects the side edge position of the recording paper sheet P in the main-scanning direction D. Assume the case where the correction method to correct the printing position of the toner image in main-scanning direction D on the recording paper sheet by changing the position of the recording paper sheet in the main-scanning direction D is selected. The respective registration rollers 211 and the respective skew correction rollers 212 stop conveying the recording paper sheet P. The moving frame 213, which supports each registration roller 211 and each skew correction roller 212, is moved in the main-scanning direction D. The position of the recording paper sheet P in the main-scanning direction D is changed, and then the conveyance of the recording paper sheet P by the respective registration rollers 211 and the respective skew correction rollers 212 are resumed. Alternatively, similar to the image forming apparatus 1 in FIG. 1, assume the case where the correction method to correct the printing position of the toner image in the main-scanning direction D on the recording paper sheet by changing the image formation position of the toner image in the main-scanning direction D on the photosensitive drum 13 is selected. The respective registration rollers 211 and the respective skew correction rollers 212 do not stop conveying the recording paper sheet P, and the moving frame 213 is not moved in the main-scanning direction D.

The recording paper sheet P is conveyed from the respective registration rollers 211 and the respective skew correction rollers 212 to the respective downstream side conveyance rollers 201. Further, the recording paper sheet P is conveyed to the nip region between the intermediate transfer belt 21 and the transfer roller 23a. At this nip region, the toner image on the intermediate transfer belt 21 is transferred. The recording paper sheet P passes through the fixing apparatus 17 and then the respective discharge rollers 36, and finally is carried out to the discharge tray 39 (see FIG. 1).

Figure 13:
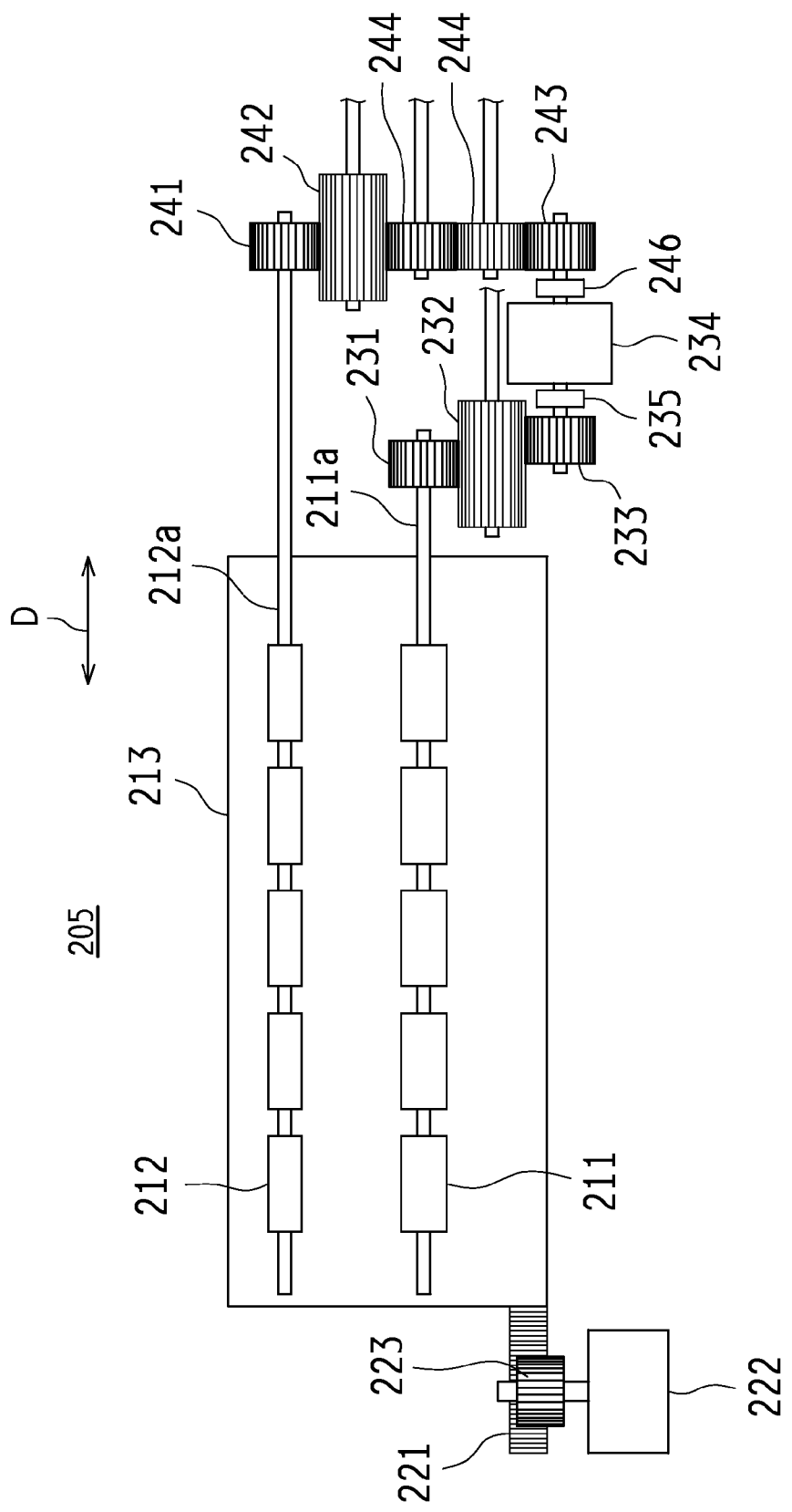
FIG. 13 is a plan view schematically illustrating a structure of the registration unit in FIG. 11.

The following describes a mechanism to move the registration unit 205 in the main-scanning direction D. FIG. 13 is a plan view schematically illustrating a structure of the registration unit 205. As illustrated in FIG. 13, at the moving frame 213, a rack gear 221 is disposed. The rack gear 221 extends in the main-scanning direction D. The rack gear 221 meshes with a pinion gear 223 secured to an output shaft of a motor for movement 222. The moving frame 213 is movably supported in the main-scanning direction D with a guide member (not illustrated). The motor for movement 222 is secured at a fixed position. Rotatably driving the pinion gear 223 by the motor for movement 222 moves the rack gear 221 in the main-scanning direction D, and the moving frame 213 moves together with the rack gear 221. A rotation direction and a rotation angle of the output shaft of the motor for movement 222 corresponds to the position of the moving frame 213 in the main-scanning direction D and the rotation direction. Accordingly, controlling the rotation angle of the output shaft of the motor for movement 222 allows moving the moving frame 213 in the main-scanning direction D and adjusting the position. This allows adjusting the position of the recording paper sheet sandwiched at the nip region between the respective registration rollers 211 and at the nip region between the respective skew correction rollers 212 in the main-scanning direction D.

The moving frame 213 rotatably supports a shaft 211a of the respective registration rollers 211. A driven gear 231 is secured to an end portion of the one shaft 211a. An intermediate gear 232 is meshed with the driven gear 231. A drive gear 233 is meshed with the intermediate gear 232. An electromagnetic clutch 235 is inserted between the shaft of the drive gear 233 and an output shaft of a motor for driving 234. The driven gear 231 moves in the main-scanning direction D together with the moving frame 213 and each registration roller 211. Positions of the intermediate gear 232 and the drive gear 233 are determined at the respective fixed positions while the motor for driving 234 is secured at the fixed position. Since the intermediate gear 232 is long in the main-scanning direction D, even if the driven gear 231 moves in the main-scanning direction D, the driven gear 231 is kept meshed with the intermediate gear 232. Between these gears 231 and 232, a rotary drive power is transmitted. While the electromagnetic clutch 235 is coupled, the motor for driving 234 rotatably drives the drive gear 233. The rotation of the drive gear 233 is transmitted to the driven gear 231 via the intermediate gear 232. The driven gear 231 rotates, the registration roller 211 at the one shaft 211a, which is coupled and secured to the driven gear 231, rotates, and then the other registration roller 211 rotatably drives.

Similarly, the moving frame 213 rotatably supports a shaft 212a of the respective skew correction rollers 212. A driven gear 241 is secured to an end portion of the one shaft 212a. An intermediate gear 242 is meshed with the driven gear 241. Two gears 244 are interposed between the intermediate gear 242 and a drive gear 243. An electromagnetic clutch 246 is inserted between the shaft of the drive gear 243 and an output shaft of the motor for driving 234. The driven gear 241 moves in the main-scanning direction D together with the moving frame 213 and each skew correction roller 212. Positions of the intermediate gear 242, each gear 244, and the drive gear 243 are determined at the respective fixed positions while the motor for driving 234 is secured at the fixed position. Since the intermediate gear 242 is long in the main-scanning direction D, even if the driven gear 241 moves in the main-scanning direction D, the driven gear 241 is kept meshed with the intermediate gear 242. Between these gears 241 and 242, a rotary drive power is transmitted. While the electromagnetic clutch 246 is coupled, the motor for driving 234 rotatably drives the drive gear 243. The rotation of the drive gear 243 is transmitted to the driven gear 241 via each gear 244 and the intermediate gear 242. The driven gear 241 rotates, the skew correction roller 212 at the one shaft 212a, which is coupled and secured to the driven gear 241, rotates, and then the other skew correction roller 212 rotatably drives.

The one motor for driving 234 drives both the respective registration rollers 211 and the respective skew correction rollers 212. Accordingly, assume the case where a reduction gear ratio from the drive gear 233 to the driven gear 231 via the intermediate gear 232 is set such that a peripheral velocity of each registration roller 211 becomes a specified value. A reduction gear ratio from the drive gear 243 to the driven gear 241 via each gear 244 and the intermediate gear 242 is set such that the peripheral velocity of each skew correction roller 212 matches the specified value. Thus, a conveyance speed of the recording paper sheet by the respective registration rollers 211 and a conveyance speed of the recording paper sheet by the respective skew correction rollers 212 are matched.

Therefore, controlling the rotation direction and the rotation angle of the output shaft of the motor for movement 222 allows moving the moving frame 213 in the main-scanning direction D and adjusting the position of the moving frame 213. By rotatably driving the motor for driving 234 and coupling and cutting off each electromagnetic clutch 235 and 246, each registration roller 211 and each skew correction roller 212 can be separately rotated and stopped.

Figure 14:
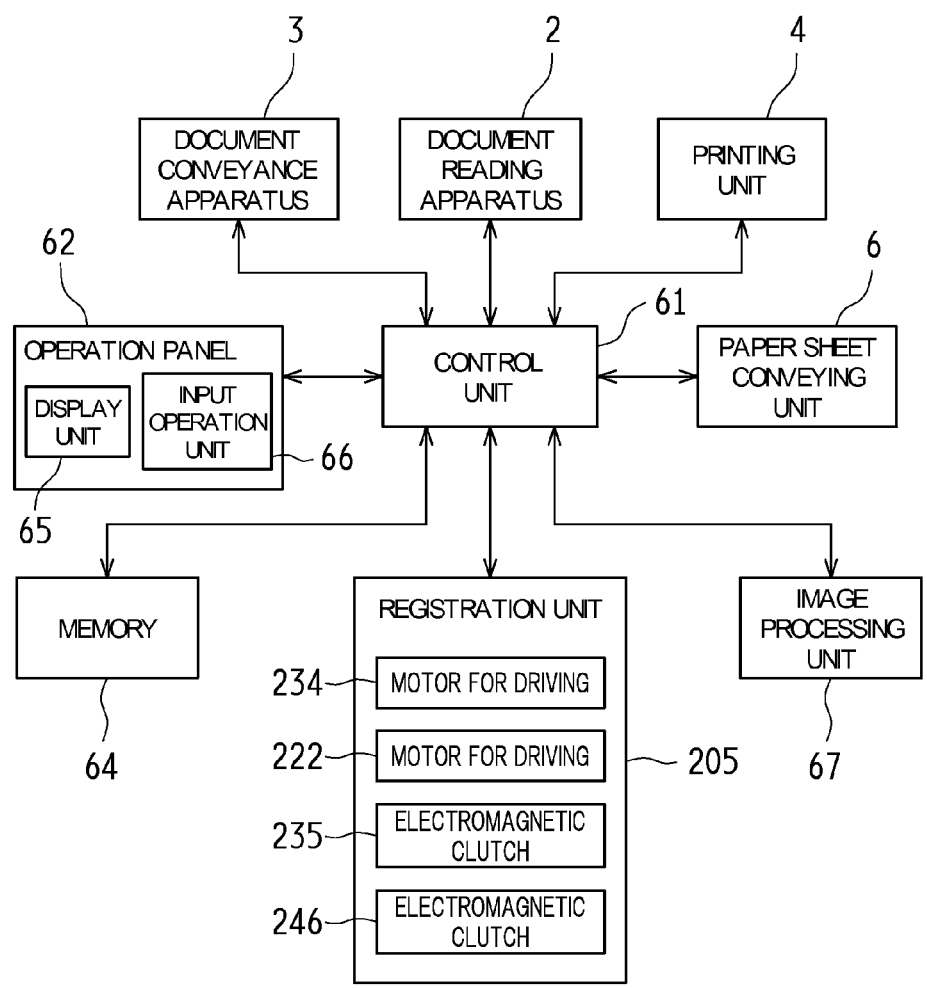
FIG. 14 is a block diagram illustrating a configuration of a control system of an image forming apparatus that includes the registration unit illustrated in FIG. 11 to FIG. 13.

FIG. 14 is a block diagram illustrating a configuration of the control system of the image forming apparatus that includes the registration unit 205 illustrated in FIG. 11 to FIG. 13. Like reference numerals designate corresponding or identical action throughout FIG. 3 and FIG. 14. The control unit 61 controls the document conveyance apparatus 3, the document reading apparatus 2, the printing unit 4, the sheet feed cassette 5, the paper sheet conveying unit 6, the registration unit 205, or a similar unit to convey the recording paper sheet, correct the printing position of the color image or the monochrome image on the recording paper sheet, and print the color image or the monochrome image on the recording paper sheet.

For example, the control unit 61 drivingly controls the paper sheet conveying unit 6 to convey and stop the recording paper sheet. The paper sheet conveying unit 6 includes each conveyance roller 35, each downstream side conveyance roller 201, each upstream side conveyance roller 208, a motor for driving (not illustrated), a gear unit (not illustrated), an electromagnetic clutch (not illustrated), a plurality of paper sheet sensors (not illustrated), or a similar part. The gear unit transmits the rotary drive power from the motor for driving to these respective rollers 35, 201, and 208. The electromagnetic clutch transmits and cuts off the rotary drive power. The plurality of paper sheet sensors are disposed at the paper sheet conveyance path R1. The control unit 61 drivingly controls the motor for driving of the paper sheet conveying unit 6. The control unit 61 also judges the conveyance position of the recording paper sheet based on an output detected by each paper sheet sensor. According to this conveyance position, the control unit 61 couples and cuts off the electromagnetic clutch. The control unit 61 rotates and stops each roller 35, 201, and 208 to cause the recording paper sheet to be conveyed and stopped.

The control unit 61 drivingly controls the motor for driving 234 of the registration unit 205. The control unit 61 also judges the conveyance position of the recording paper sheet based on outputs detected by the downstream side paper sheet sensor 204 and the upstream side paper sheet sensor 207. According to this conveyance position, the control unit 61 drivingly controls each electromagnetic clutch 235 and 246 to separately rotate and stop each registration roller 211 and each skew correction roller 212 to cause the recording paper sheet to be conveyed and stopped.

The control unit 61 obtains the displacement amount of the recording paper sheet in the main-scanning direction based on the side edge position of the recording paper sheet in the main-scanning direction, which is detected by the line sensor 203. According to this displacement amount, the control unit 61 controls the rotation direction and the rotation angle of the output shaft of the motor for movement 222. The control unit 61 causes the moving frame 213 to move in the main-scanning direction. The control unit 61 adjusts the position of the recording paper sheet in the main-scanning direction sandwiched at the nip region between the respective registration rollers 211 and the nip region between the respective skew correction rollers 212 to correct the printing position of the toner image in the main-scanning direction on the recording paper sheet. Alternatively, the control unit 61 obtains the displacement amount of the recording paper sheet in the main-scanning direction based on the side edge position of the recording paper sheet in the main-scanning direction, which is detected by the line sensor 203. According to this displacement amount, the control unit 61 corrects the image shape position(s) in the main-scanning direction on the plurality of or the single photosensitive drum(s) 13 to correct the printing position(s) of the toner image(s) in the main-scanning direction on the recording paper sheet.

The following describes the correction method to correct the printing position of the toner image in the main-scanning direction on the recording paper sheet with the image forming apparatus that includes the registration unit 205 illustrated in FIG. 11 to FIG. 13 in detail. This image forming apparatus preliminary prepares the real-time paper sheet moving correction, the real-time judgment paper sheet moving correction, the most recent prediction correction, and the all-average-value prediction correction as the correction methods and selectively uses these corrections. The memory 64 preliminary stores procedures for these corrections. The control unit 61 reads out the procedures from the memory 64 for execution.

[Real-Time Paper Sheet Moving Correction]

Figure 15:
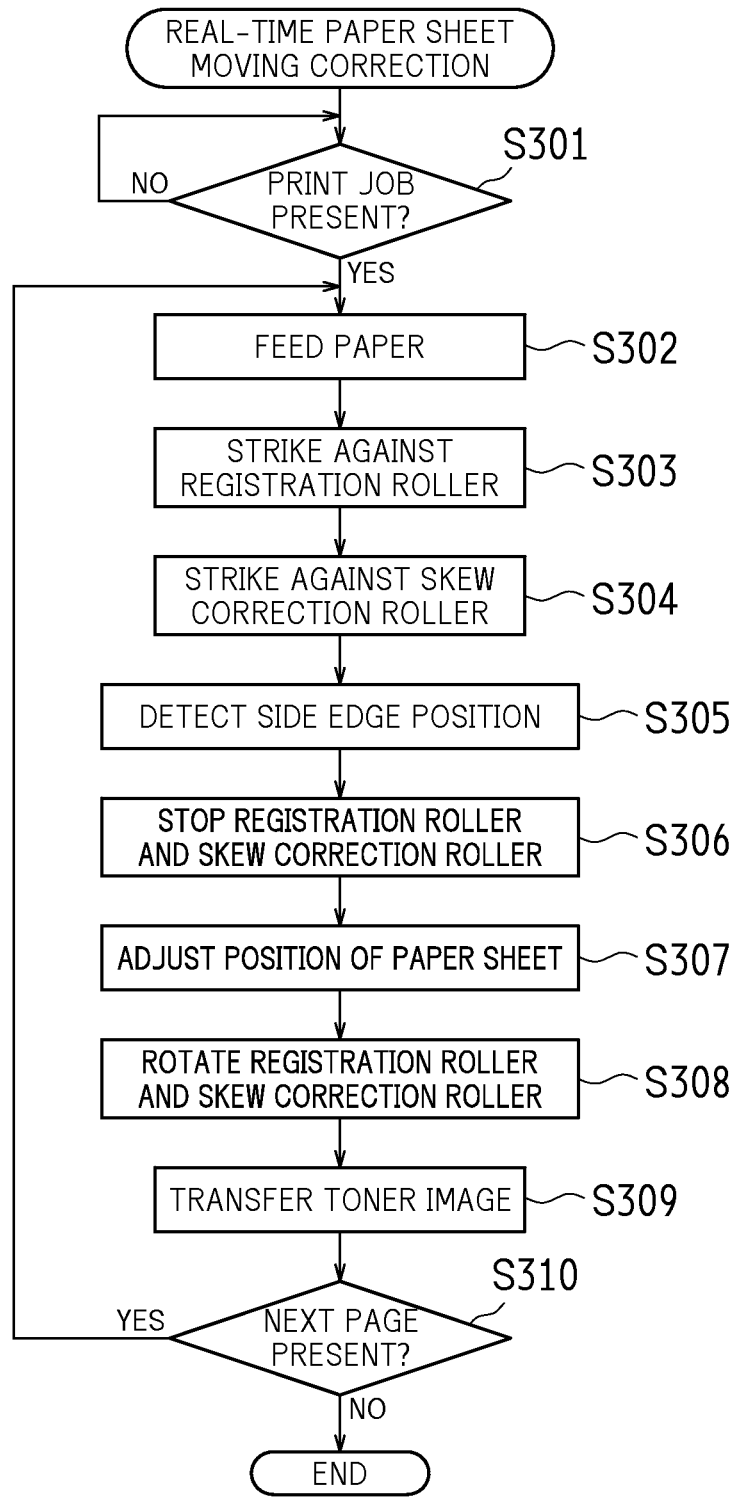
FIG. 15 is a flowchart illustrating a procedure for a real-time paper sheet moving correction to correct the printing position on the recording paper sheet in the image forming apparatus that includes the registration unit illustrated in FIG. 11 to FIG. 13.

FIG. 15 is a flowchart illustrating a procedure for the real-time paper sheet moving correction. First, when the control unit 61 receives the print job request by the operation to the operation panel 62 (Yes at Step S301), the control unit 61 feeds the first recording paper sheet from the sheet feed cassette 5 (Step S302). This recording paper sheet is sequentially conveyed by the respective conveyance rollers 35 and the respective upstream side conveyance rollers 208, further passes through between the respective upstream side guide members 206, and is conveyed to the registration unit 205.

At this time, the control unit 61 cuts off the electromagnetic clutch 235 of the registration unit 205. With each registration roller 211 stopped, the control unit 61 waits for the upstream side paper sheet sensor 207 to detect the top edge of the recording paper sheet. Upon detection of the top edge of the recording paper sheet, the control unit 61 causes each registration roller 211 to be kept stopped from this time point of detection until an elapse of first specified time, causes the top edge of the recording paper sheet to strike against each stopped registration roller 211, and aligns the top edge of the recording paper sheet parallel to each registration roller 211 (Step S303).

The control unit 61 sets a starting time point of scanning (a) surface(s) of the plurality of or the single photosensitive drum(s) 13 by the light scanning device 11 according to the time point of detecting the top edge of the recording paper sheet by the upstream side paper sheet sensor 207, that is, the starting time point of writing (an) electrostatic latent image(s) on the surface(s) of the plurality of or the single photosensitive drum(s) 13, and starts writing the electrostatic latent image(s).

Subsequently, the control unit 61 cuts off the electromagnetic clutch 246 of the registration unit 205 and couples the electromagnetic clutch 235 of the registration unit 205 with each skew correction roller 212 stopped. The control unit 61 rotates each registration roller 211 to resume conveying the recording paper sheet. The control unit 61 causes the top edge of the recording paper sheet to strike against each stopped skew correction roller 212, and aligns the top edge of the recording paper sheet parallel to each skew correction roller 212 (Step S304). Therefore, the top edge of the recording paper sheet is struck against each registration roller 211 and each skew correction roller 212 twice, and is aligned parallel to the rollers 211 and 212.

Further, the control unit 61 couples the electromagnetic clutch 246 of the registration unit 205 and rotates each skew correction roller 212 to resume conveying the recording paper sheet. Then, the control unit 61 waits for the downstream side paper sheet sensor 204 to detect the top edge of the recording paper sheet. After the elapse of the second specified time after the detection of the top edge of the recording paper sheet, that is, when the line sensor 203 detects the side edge position of the recording paper sheet in the main-scanning direction at a specified timing that the top edge of the recording paper sheet passing through the line sensor 203, the memory 64 stores this side edge position (Step S305).

The control unit 61 cuts off the respective electromagnetic clutches 235 and 246 of the registration unit 205 at the specified timing to stop each registration roller 211 and each skew correction roller 212 (Step S306). At this time, the recording paper sheet is sandwiched at the nip region between the respective registration rollers 211 and the nip region between the respective skew correction rollers 212, and a rear end of the recording paper sheet is away from each upstream side conveyance roller 208. Accordingly, moving the moving frame 213 in the main-scanning direction allows moving the recording paper sheet, which is sandwiched between the nip regions, in the main-scanning direction and adjusting the position of the recording paper sheet in the main-scanning direction.

The control unit 61 obtains the displacement amount of the recording paper sheet in the main-scanning direction based on the side edge position of the recording paper sheet in the main-scanning direction, which is detected by the line sensor 203. According to this displacement amount, the control unit 61 controls the rotation direction and the rotation angle of the output shaft of the motor for movement 222. The control unit 61 causes the moving frame 213 to move in the main-scanning direction to adjust the position of the recording paper sheet, which is sandwiched at the nip region between the respective registration rollers 211 and at the nip region between the respective skew correction rollers 212, in the main-scanning direction to eliminate the displacement of the recording paper sheet in the main-scanning direction (Step S307).

For example, as illustrated in FIG. 11, in the case where a center of the recording paper sheet is displaced from the preset center position F by a distance $\Delta L$ in the arrow direction, the side edge position of the recording paper sheet is displaced from the specified position by the distance $\Delta L$. Accordingly, when moving the moving frame 213 in the opposite direction from the arrow direction by the distance $\Delta L$, the recording paper sheet sandwiched at the nip region between the respective registration rollers 211 and the nip region between the respective skew correction rollers 212 is moved in the opposite direction from the arrow direction by the distance $\Delta L$. This corrects the position of the recording paper sheet in the main-scanning direction, matching the center of the recording paper sheet and the center position F. In the case where the displacement amount of the recording paper sheet in the main-scanning direction is 0 (the distance $\Delta L=0$), the moving frame 213 is not moved, and the recording paper sheet is not moved in the main-scanning direction.

After this, the control unit 61 sets a resuming time point of conveying the recording paper sheet by the respective registration rollers 211 and the respective skew correction rollers 212 according to the starting time point of writing the electrostatic latent image(s) on the surface(s) of the plurality of or the single photosensitive drum(s) 13. The control unit 61 couples each electromagnetic clutch 235 and 246 of the registration unit 205 and rotates each registration roller 211 and each skew correction roller 212 to resume conveying the recording paper sheet (Step S308). The recording paper sheet passes through the respective downstream side conveyance rollers 201 and is conveyed to the nip region between the intermediate transfer belt 21 and the transfer roller 23a. At this nip region, the toner image on the intermediate transfer belt 21 is transferred to the recording paper sheet. At this time, since the center of the recording paper sheet and the center position F match, the toner image is transferred to the recording paper sheet without displaced in the main-scanning direction (Step S309). Additionally, according to the starting time point of writing the electrostatic latent image, the resuming time point of conveying the recording paper sheet is set. This matches the transfer timing of the toner image at the nip region between the intermediate transfer belt 21 and the transfer roller 23a with a timing of the recording paper sheet reaching the nip region, and the toner image is transferred to the recording paper sheet also without displaced in the sub-scanning direction.

Hereinafter, the control unit 61 checks whether the next recording paper sheet to be printed is present or not (Step S310), when the next recording paper sheet to be printed is present ("Yes" at Step S310), the processes from Step S302 are repeated. If the next recording paper sheet to be printed is absent ("No" at Step S310), the processes in FIG. 15 are terminated.

That is, the real-time paper sheet moving correction is the following correction method. This method detects the side edge position of the recording paper sheet in the main-scanning direction by the line sensor 203 to obtain the displacement amount of the recording paper sheet in the main-scanning direction. This method then stops each registration roller 211 and each skew correction roller 212, and moves the moving frame 213 in the main-scanning direction and adjusts the position of the recording paper sheet in the main-scanning direction while sandwiching the recording paper sheet at the nip region between the respective registration rollers 211 and at the nip region between the respective skew correction rollers 212 to eliminate the displacement of the recording paper sheet. After this, this method resumes conveying the recording paper sheet by the respective registration rollers 211 and the respective skew correction rollers 212 to transfer the toner image on the intermediate transfer belt 21 to the recording paper sheet. This is the correction method that obtains the displacement amount of the recording paper sheet in the main-scanning direction for each recording paper sheet and eliminates the displacement of the recording paper sheet. In view of this, the printing position of the toner image in the main-scanning direction on the recording paper sheet is maintained at high accuracy. However, when moving the moving frame 213 in the main-scanning direction, since the conveyance of the recording paper sheet is stopped, the image formation time for each recording paper sheet lengthens. Therefore, compared with the all-average-value prediction correction, which is described later in detail, the number of printed sheets per unit time is reduced. Since conveyance stop time of the recording paper sheet is set the same for both the color image and the monochrome image, the number of printed sheets per unit time does not greatly differ between the color image and the monochrome image.

[Real-Time Judgment Paper Sheet Moving Correction]

Figure 16:
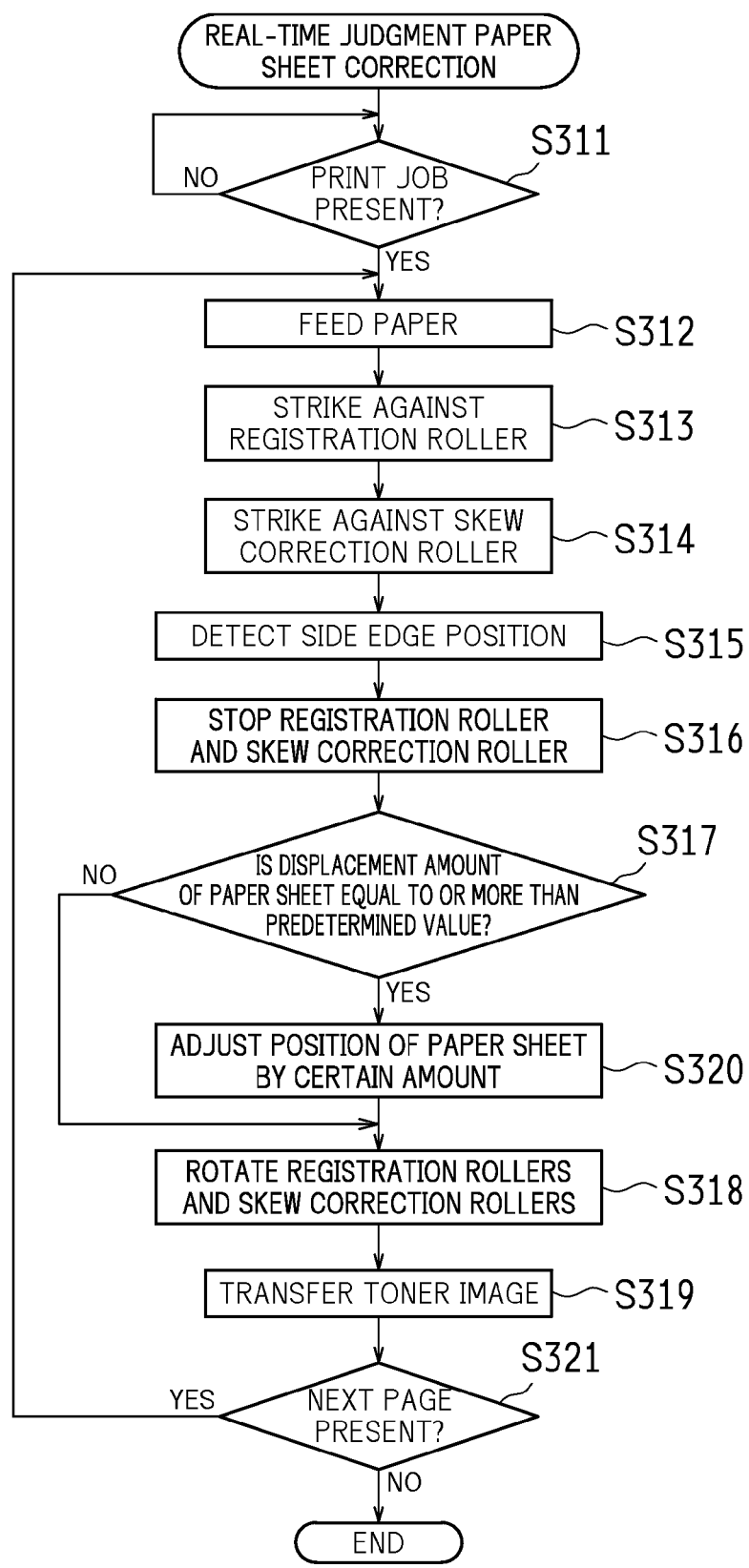
FIG. 16 is a flowchart illustrating a procedure for a real-time judgment paper sheet moving correction to correct the printing position on the recording paper sheet in the image forming apparatus that includes the registration unit illustrated in FIG. 11 to FIG. 13.

FIG. 16 is a flowchart illustrating a procedure for the real-time judgment paper sheet moving correction. First, when the control unit 61 receives the print job request by the operation to the operation panel 62 (Yes at Step S311), the control unit 61 feeds the first recording paper sheet from the sheet feed cassette 5 (Step S312), and conveys the recording paper sheet to the registration unit 205.

At this time, the control unit 61 cuts off the electromagnetic clutch 235 of the registration unit 205 to stop each registration roller 211 and causes each registration roller 211 to be kept stopped from the time point of detection of the top edge of the recording paper sheet by the upstream side paper sheet sensor 207 until an elapse of the first specified time. Then, the control unit 61 causes the top edge of the recording paper sheet to strike against each stopped registration roller 211, and aligns the top edge of the recording paper sheet parallel to each registration roller 211 (Step S313).

The control unit 61 sets a starting time point of scanning (a) surface(s) of the plurality of or the single photosensitive drum(s) 13 by the light scanning device 11 according to the time point of detecting the top edge of the recording paper sheet by the upstream side paper sheet sensor 207, that is, the starting time point of writing the electrostatic latent image(s) on the surface(s) of the plurality of or the single photosensitive drum(s) 13, and starts writing the electrostatic latent image(s).

Subsequently, the control unit 61 cuts off the electromagnetic clutch 246 of the registration unit 205, stops each skew correction roller 212, and couples the electromagnetic clutch 235 of the registration unit 205 in this state. The control unit 61 starts conveying the recording paper sheet by the respective registration rollers 211. The control unit 61 causes the top edge of the recording paper sheet to strike against each stopped skew correction roller 212, and aligns the top edge of the recording paper sheet parallel to each skew correction roller 212 (Step S314).

Further, the control unit 61 couples the electromagnetic clutch 246 of the registration unit 205 and rotates each skew correction roller 212 to resume conveying the recording paper sheet. After the elapse of the second specified time from the time point of detecting the top edge of the recording paper sheet by the downstream side paper sheet sensor 204, that is, when the line sensor 203 detects the side edge position of the recording paper sheet in the main-scanning direction at the specified timing that the top edge of the recording paper sheet passing through the line sensor 203, the memory 64 stores this side edge position (Step S315).

The control unit 61 cuts off each electromagnetic clutch 235 and 246 of the registration unit 205 at the specified timing to stop each registration roller 211 and each skew correction roller 212 (Step S316). At this time, the recording paper sheet is sandwiched at the nip region between the respective registration rollers 211 and the nip region between the respective skew correction rollers 212, and the rear end of the recording paper sheet is away from each upstream side conveyance roller 208.

Subsequently, the control unit 61 obtains the displacement amount of the recording paper sheet in the main-scanning direction based on the side edge position of the recording paper sheet in the main-scanning direction, which is detected by the line sensor 203. The control unit 61 then judges whether this displacement amount is equal to or more than a predetermined value or not (Step S317). For example, if the displacement amount is less than the predetermined value ("No" at Step S317), the control unit 61 does not adjust the position of the recording paper sheet in the main-scanning direction and couples each electromagnetic clutch 235 and 246 of the registration unit 205 according to the starting time point of writing the electrostatic latent image on the surface(s) of the plurality of or the single photosensitive drum(s) 13 to resume conveying the recording paper sheet by the respective registration rollers 211 and the respective skew correction rollers 212 (Step S318). The recording paper sheet passes through the respective downstream side conveyance rollers 201 and is conveyed to the nip region between the intermediate transfer belt 21 and the transfer roller 23a. At this nip region, the toner image on the intermediate transfer belt 21 is transferred to the recording paper sheet (Step S319).

When the displacement amount of the recording paper sheet in the main-scanning direction is equal to or more than the predetermined value ("Yes" at Step S317), the control unit 61 controls the rotation direction and the rotation angle of the output shaft of the motor for movement 222 to move the moving frame 213 in the opposite direction from a displacement direction of the recording paper sheet by a certain amount. The control unit 61 adjusts the position of the recording paper sheet sandwiched at the nip region between the respective registration rollers 211 and the nip region between the respective skew correction rollers 212 in the main-scanning direction by the certain amount to reduce the displacement of the recording paper sheet in the main-scanning direction (Step S320).

For example, the predetermined value compared with the displacement amount is set around 2 mm as a default. A serviceman or the user changes the predetermined value by operating the input operation unit 66 of the operation panel 62 illustrated in FIG. 14 and checks the predetermined value from a display on the display unit 65.

After this, the control unit 61 sets the resuming time point of conveying the recording paper sheet with the respective registration rollers 211 and the respective skew correction rollers 212 according to the starting time point of writing the electrostatic latent image(s) on the surface(s) of the plurality of or the single photosensitive drum(s) 13. The control unit 61 then resumes conveying the recording paper sheet by the respective registration rollers 211 and the respective skew correction rollers 212 (Step S318). The recording paper sheet passes through the respective downstream side conveyance rollers 201 and is conveyed to the nip region between the intermediate transfer belt 21 and the transfer roller 23a. At this nip region, the toner image on the intermediate transfer belt 21 is transferred to the recording paper sheet (Step S319). At this time, since the displacement of the recording paper sheet in the main-scanning direction is reduced, the toner image is transferred to the recording paper sheet without tremendously displaced in the main-scanning direction. Additionally, according to the starting time point of writing the electrostatic latent image, the resuming time point of conveying the recording paper sheet is set. This matches the transfer timing of the toner image at the nip region between the intermediate transfer belt 21 and the transfer roller 23a with timing of the recording paper sheet reaching the nip region, and the toner image is printed to the recording paper sheet also without displaced in the sub-scanning direction.

Hereinafter, the control unit 61 checks whether the next recording paper sheet to be printed is present or not (Step S321), when the next recording paper sheet to be printed is present ("Yes" at Step S321), the processes from Step S312 are repeated. If the next recording paper sheet to be printed is absent ("No" at Step S321), the processes in FIG. 16 are terminated.

That is, the real-time judgment paper sheet moving correction is a correction method that detects the side edge position of the recording paper sheet in the main-scanning direction by the line sensor 203 and obtains the displacement amount of the recording paper sheet in the main-scanning direction. In the case where the displacement amount is less than the predetermined value, the real-time judgment paper sheet moving correction stops conveying the recording paper sheet and resumes conveying the recording paper sheet while not moving the moving frame 213 in the main-scanning direction, and transfers the toner image on the intermediate transfer belt 21 to the recording paper sheet. In the case where the displacement amount is equal to or more than the predetermined value, the real-time judgment paper sheet moving correction stops conveying the recording paper sheet, and then moves the moving frame 213 in the opposite direction from the displacement direction of the recording paper sheet by the certain amount to reduce the displacement of the recording paper sheet in the main-scanning direction. After this, this correction method resumes conveying the recording paper sheet and transfers the toner image on the intermediate transfer belt 21 to the recording paper sheet. This correction method obtains the displacement amount of the recording paper sheet in the main-scanning direction of each recording paper sheet. Only when the displacement amount is equal to or more than the predetermined value, this method reduces the displacement of the recording paper sheet. In view of this, the printing position of the toner image in the main-scanning direction on the recording paper sheet is mostly maintained at high accuracy. Additionally, this method restricts a moving amount of the moving frame 213 in the main-scanning direction to the certain amount, ensuring shortening time required for the drive control of the motor for movement 222. Further, this allows shorting time from the starting time point of writing the electrostatic latent image on the photosensitive drum 13 until the transfer timing of the toner image to the recording paper sheet, ensuring reducing a degree of reduction in the number of printed sheets per unit time. For example, the degree of reduction in the number of printed sheets per unit time in the real-time judgment paper sheet moving correction with respect to the all-average-value prediction correction, which is described later in detail, is half compared with the degree of reduction in the number of printed sheets per unit time in the real-time paper sheet moving correction with respect to the all-average-value prediction correction. Therefore, while reducing the displacement amount of the printing position of the toner image in the main-scanning direction on the recording paper sheet, the degree of reduction in the number of printed sheets per unit time can be reduced. Since the conveyance stop time of recording paper sheet is set the same for both the color image and the monochrome image, the number of printed sheets per unit time does not greatly differ between the color image and the monochrome image.

[Most Recent Prediction Correction]

Figure 17A:
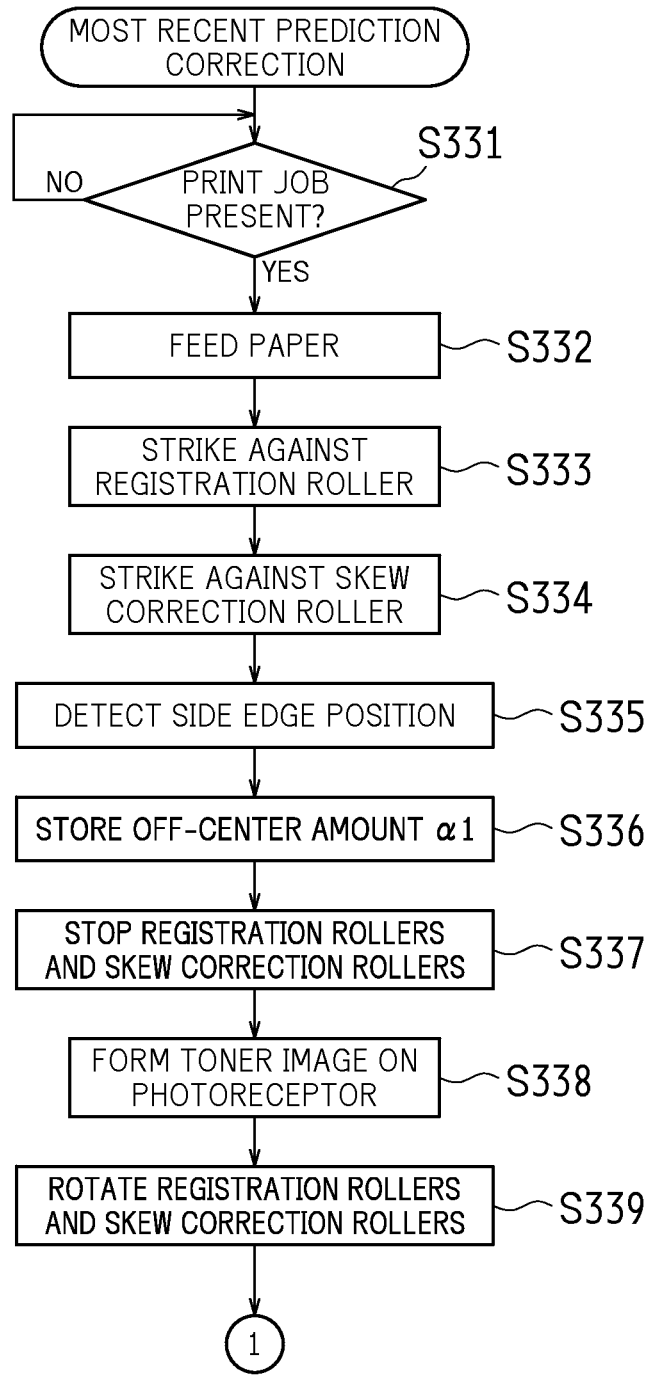
FIG. 17A is a flowchart illustrating a procedure for the most recent prediction correction to correct the image formation position on the photosensitive drum in the image forming apparatus that includes the registration unit illustrated in FIG. 11 to FIG. 13.
Figure 17B:
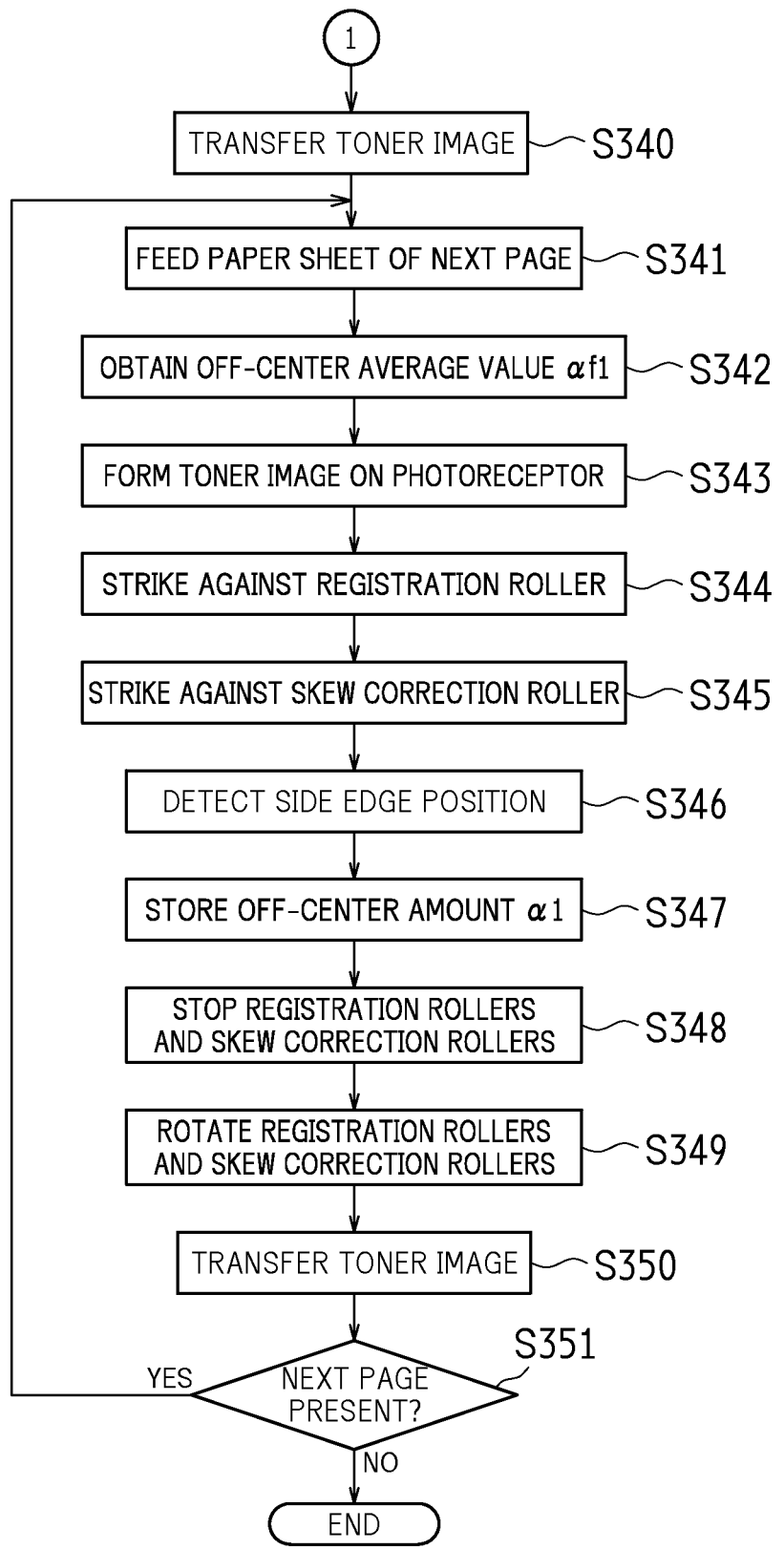
FIG. 17B is a flowchart illustrating the procedure for the most recent prediction correction continuous from FIG. 17A.

FIG. 17A and FIG. 17B are flowcharts illustrating a procedure for the most recent prediction correction. First, upon request of the print job (Yes at S331), the first recording paper sheet is fed from the sheet feed cassette 5 (Step S332). The top edge of the first recording paper sheet is struck against each registration roller 211 and each skew correction roller 212 twice to align the first recording paper sheet parallel to this each roller 211 and 212 (Steps S333 and S334).

Figure 5:
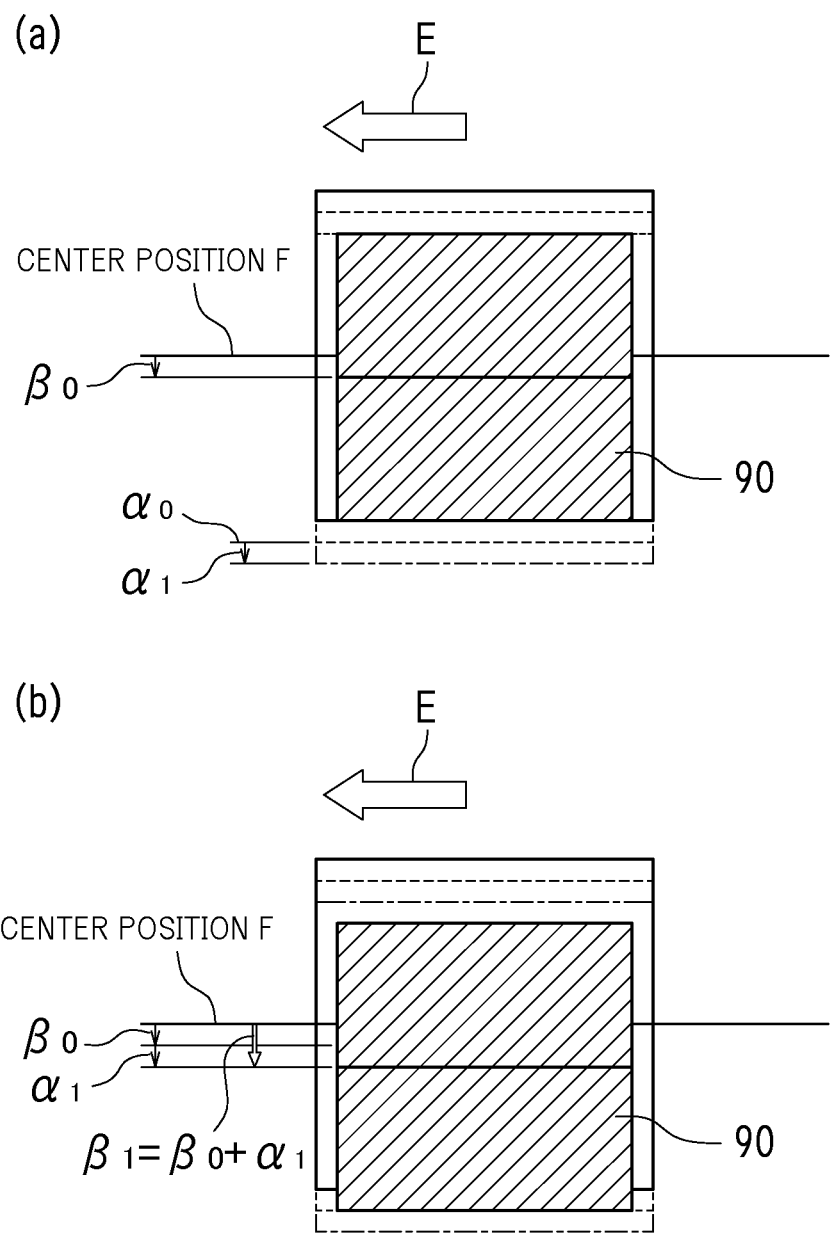
FIG. 5A is a drawing used for describing an off-center amount (a displacement amount) of a recording paper sheet and an image formation position on the photosensitive drum.
FIG. 5B is a drawing used for describing the off-center amount (the displacement amount) of the recording paper sheet and the image formation position on the photosensitive drum.

Further, at the specified timing of the top edge of the first recording paper sheet passing through the line sensor 203, the line sensor 203 detects the side edge position of the recording paper sheet in the main-scanning direction (Step S335). The off-center amount (the displacement amount) $\alpha 1$ illustrated in FIG. 5 is obtained and stored in the memory 64 (Step S336). At the specified timing, the respective registration rollers 211 and the respective skew correction rollers 212 stop conveying the recording paper sheet (Step S337). Based on the off-center amount $\alpha 1$, the correction amount $\beta 1$ of the image formation position on the photosensitive drum 13 in the main-scanning direction is obtained, and the image formation position of the photosensitive drum 13 in the main-scanning direction is corrected. Then, the toner image is formed at the corrected image formation position of the photosensitive drum 13 (Step S338). Therefore, the electrostatic latent image(s) is/are formed at the corrected image formation position(s) on the plurality of or the single photosensitive drum(s) 13. The electrostatic latent image(s) is/are developed to form the toner image(s).

After this, based on the corrected image formation position(s) on the photosensitive drum(s) 13, the resuming time point of conveying the recording paper sheet by the respective registration rollers 211 and the respective skew correction rollers 212 are set, and the conveyance of the recording paper sheet is resumed from this resuming time point of conveyance (Step S339). The toner image is transferred at the nip region N between the intermediate transfer belt 21 and the transfer roller 23a to the recording paper sheet (Step S340).

Next, feeding of the second recording paper sheet from the sheet feed cassette 5 is started (Step S341). According to the time point of detecting the top edge of the second recording paper sheet by the upstream side paper sheet sensor 207, the light scanning device 11 sets the starting time point of scanning the surface(s) of the plurality of or the single photosensitive drum(s) 13, and the writing of the electrostatic latent image is started. Simultaneously, the off-center average value $\alpha f1$ ($=\alpha 1$), which is an average value of the off-center amount $\alpha 1$ of the previous recording paper sheet (the first recording paper sheet), is obtained (Step S342). Based on the off-center average value $\alpha f1$, the correction amount $\beta 1$ is obtained, and the image formation position of the photosensitive drum 13 in the main-scanning direction (an electrostatic latent image forming position) is corrected (Step S343).

The top edge of the second recording paper sheet is struck against each registration roller 211 and each skew correction roller 212 twice and is aligned parallel to these respective rollers 211 and 212 (Steps S344 and S345). At the specified timing of the top edge of the second recording paper sheet passing through the line sensor 203, the line sensor 203 detects the side edge position of the recording paper sheet in the main-scanning direction (Step S346). The off-center amount (the displacement amount) $\alpha 1$ is obtained and is stored in the memory 64 (Step S347). At the specified timing, the respective registration rollers 211 and the respective skew correction rollers 212 stop conveying the recording paper sheet (Step S348).

After this, according to the starting time point of writing the electrostatic latent image(s) on the surface(s) of the plurality of or the single photosensitive drum(s) 13, the starting time point of conveying the recording paper sheet by the respective registration rollers 211 and the respective skew correction rollers 212 is set, and the conveyance of the recording paper sheet is resumed from this starting time point of conveyance (Step S349). The toner image is transferred at the nip region N between the intermediate transfer belt 21 and the transfer roller 23a to the recording paper sheet (Step S350).

Subsequently, when the next recording paper sheet to be printed is present ("Yes" at Step S351), the processes from Step S341 are repeated. Therefore, feeding of the recording paper sheet is started (Step S341). According to the time point of detecting the top edge of the recording paper sheet by the upstream side paper sheet sensor 207, the light scanning device 11 sets the starting time point of scanning the surface(s) of the plurality of or the single photosensitive drum(s) 13. Simultaneously, the off-center average value $\alpha f1$, which is the average value of the off-center amounts $\alpha 1$ of previous (the first and the second) recording paper sheets, is obtained (Step S342). Based on the off-center average value $\alpha f1$, the correction amount $\beta 1$ is obtained, and the image formation position on the photosensitive drum 13 in the main-scanning direction (the electrostatic latent image forming position) is corrected (Step S343). Further, the line sensor 203 detects the side edge position of the recording paper sheet in the main-scanning direction (Step S346). The off-center amount $\alpha 1$ is obtained and is stored in the memory 64 (Step S347). The respective registration rollers 211 and the respective skew correction rollers 212 once stop conveying the recording paper sheet (Step S348). According to the starting time point of writing the electrostatic latent image(s) on the surface(s) of the plurality of or the single photosensitive drum(s) 13, the conveyance of the recording paper sheet is resumed (Step S349). The toner image is transferred at the nip region N between the intermediate transfer belt 21 and the transfer roller 23a to the recording paper sheet (Step S350).

Hereinafter, similarly, when the next recording paper sheet to be printed is present ("Yes" at Step S351), the processes from Steps S341 to S350 are repeated. If the next recording paper sheet to be printed is absent ("No" at Step S351), the processes in FIG. 17A and FIG. 17B are terminated.

That is, the most recent prediction correction is the following correction method. To continuously print the plurality of recording paper sheets, this method detects the side edge position of the recording paper sheet for the first recording paper sheet in the main-scanning direction by the line sensor 203 to obtain the displacement amount of the recording paper sheet in the main-scanning direction. Using this displacement amount, this method corrects the image formation position(s) (the electrostatic latent image forming position(s)) on the plurality of or the single photosensitive drum(s) 13 in the main-scanning direction and then starts conveying the recording paper sheet by the respective registration rollers 211 and the respective skew correction rollers 212. After that, this method transfers the toner image(s) at the nip region N between the intermediate transfer belt 21 and the transfer roller 23a to the recording paper sheet. Subsequently, regarding the second recording paper sheet, using the displacement amount of the first recording paper sheet in the main-scanning direction, this method corrects the image formation position(s) on the plurality of or the single photosensitive drum(s) 13 in the main-scanning direction. Further, regarding the third and later recording paper sheets, this method corrects the image formation position(s) on the plurality of or the single photosensitive drum(s) 13 in the main-scanning direction using the average value of the displacement amounts of previous recording paper sheets in the main-scanning direction. In view of this, regarding the first recording paper sheet, this method starts forming the electrostatic latent image(s) on the surface(s) of the plurality of or the single photosensitive drum(s) 13 after detecting the side edge position of the recording paper sheet in the main-scanning direction by the line sensor 203; therefore, the image formation time becomes long. However, regarding the second and later recording paper sheets, before the line sensor 203 detects the side edge position of the recording paper sheet in the main-scanning direction (or is not restricted by the detection), the operation of forming the electrostatic latent image(s) on the plurality of or the single photosensitive drum(s) 13 can be started. Accordingly, the image formation time for each recording paper sheet is the shortest time same as the case where the image formation position in the main-scanning direction is not corrected. This increases the number of printed sheets per unit time.

In the comparison between the color image and the monochrome image, in printing of the first recording paper sheet, the image formation time of the color image is substantially longer than the image formation time of the monochrome image. However, in printing of the second and later recording paper sheets, the difference between the image formation time of color image and the image formation time of monochrome image becomes small, also reducing the difference in the number of printed sheets per unit time.

[All-Average-Value Prediction Correction]

Figure 18:
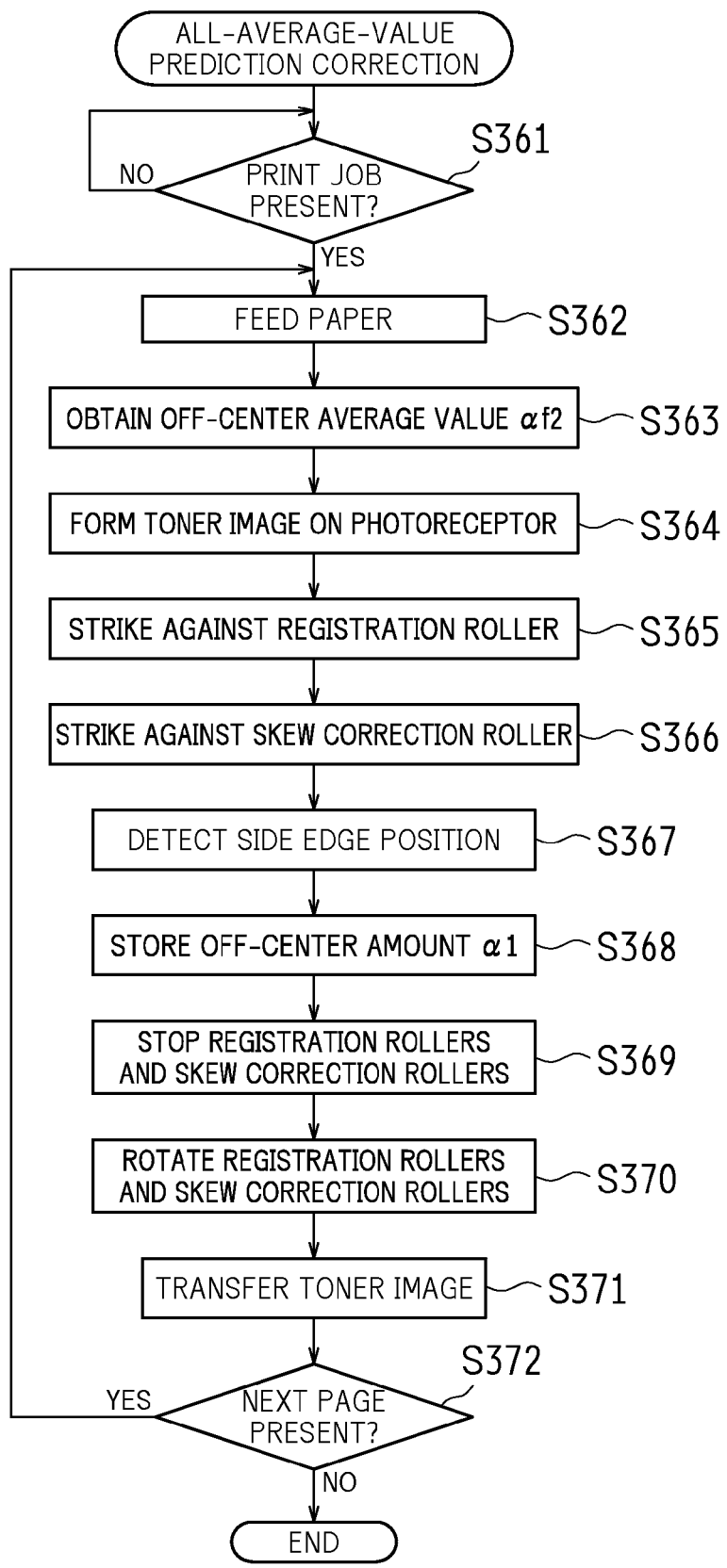
FIG. 18 is a flowchart illustrating a procedure for the all-average-value prediction correction to correct image formation position on the photosensitive drum in the image forming apparatus that includes the registration unit illustrated in FIG. 11 to FIG. 13.

FIG. 18 is a flowchart illustrating a procedure for the all-average-value prediction correction. First, upon request of the print job (Yes at S361), the first recording paper sheet is fed from the sheet feed cassette 5 (Step S362). According to the time point of detecting the top edge of the recording paper sheet by the upstream side paper sheet sensor 207, the light scanning device 11 sets the starting time point of scanning the surface(s) of the plurality of or the single photosensitive drum(s) 13, and the writing of the electrostatic latent image is started. Simultaneously, the off-center average value $\alpha f2$, which is an average value of the all off-center amounts $\alpha 1$ (illustrated in FIG. 5) obtained from the certain number of respective past print jobs, is read from the memory 64 (Step S363). Based on the off-center average value $\alpha f2$, the correction amount $\beta 1$ is obtained, and the image formation position (the electrostatic latent image position) on the photosensitive drum 13 is corrected (Step S364). Therefore, the electrostatic latent image(s) is/are formed at the corrected image formation position(s) of the plurality of or the single photosensitive drum(s) 13. The electrostatic latent image(s) are developed to form the toner image(s). The off-center average value $\alpha f2$ is obtained by averaging the all off-center amounts $\alpha 1$ obtained from the certain number of respective past print jobs whenever the print job is terminated and is stored and updated in the memory 64.

The top edge of the recording paper sheet is struck against each registration roller 211 and each skew correction roller 212 twice and is aligned parallel to these respective rollers 211 and 212 (Steps S365 and S366). At the specified timing of the top edge of the second recording paper sheet passing through the line sensor 203, the line sensor 203 detects the side edge position of the recording paper sheet in the main-scanning direction (Step S367). The off-center amount (the displacement amount) $\alpha 1$ is obtained and is stored in the memory 64 (Step S368). At the specified timing, the respective registration rollers 211 and the respective skew correction rollers 212 stop conveying the recording paper sheet (Step S369).

After this, the resuming time point of conveying the recording paper sheet by the respective registration rollers 211 and the respective skew correction rollers 212 according to the starting time point of writing the electrostatic latent image(s) on the surface(s) of the plurality of or the single photosensitive drum(s) 13 is set. Then, conveyance of the recording paper sheet by the respective registration rollers 211 and the respective skew correction rollers 212 is resumed (Step S370). The recording paper sheet passes through the respective downstream side conveyance rollers 201 and is conveyed to the nip region between the intermediate transfer belt 21 and the transfer roller 23*a*. At this nip region, the toner image on the intermediate transfer belt 21 is transferred to the recording paper sheet (Step S371). At this time, since the displacement of the recording paper sheet is eliminated, the toner image is transferred to the recording paper sheet without displaced in the main-scanning direction. Additionally, according to the starting time point of writing the electrostatic latent image, the resuming time point of conveying the recording paper sheet is set. Accordingly, the toner image is transferred to the recording paper sheet also without displaced in the sub-scanning direction.

Subsequently, this method checks whether the next recording paper sheet to be printed is present or not (Step S372), when the next recording paper sheet to be printed is present ("Yes" at Step S372), the processes from Step S362 are repeated. If the next recording paper sheet to be printed is absent ("No" at Step S372), the processes in FIG. 18 are terminated.

That is, whenever the print job is performed, the all-average-value prediction correction detects the side edge position of each recording paper sheet in the main-scanning direction by the line sensor 203 and obtains and stores the displacement amount of each recording paper sheet in the main-scanning direction. Whenever the print job is performed, this method uses the average value of all the displacement amounts obtained from the certain number of respective past print jobs to correct the image formation position(s) on the plurality of or the single photosensitive drum(s) 13 in the main-scanning direction. In view of this, similar to the second and later recording paper sheets in the most recent prediction correction, the image formation time for each recording paper sheet is the shortest time same as the case where the image formation position in the main-scanning direction is not corrected. This makes the number of printed sheets per unit time the largest. In the comparison between the color image and the monochrome image, the difference in the image formation time is small, and the difference in the number of printed sheets per unit time is also small.

The following describes combinations of the real-time paper sheet moving correction, the real-time judgment paper sheet moving correction, the most recent prediction correction, and the all-average-value prediction correction according to the color image and the monochrome image.

FIG. 19 is drawings and tables illustrating a fifth correction mode of a fifth embodiment, a sixth correction mode of a sixth embodiment, a seventh correction mode of a seventh embodiment, and an eighth correction mode of an eighth embodiment corresponding to the combinations of the real-time paper sheet moving correction, the real-time judgment paper sheet moving correction, the most recent prediction correction, and the all-average-value prediction correction. As illustrated in the drawings and tables in FIG. 19, the fifth correction mode of the fifth embodiment applies the real-time paper sheet moving correction to both the color image and the monochrome image. The sixth correction mode of the sixth embodiment applies the all-average-value prediction correction to the color image and applies the real-time paper sheet moving correction to the monochrome image. Further, the seventh correction mode of the seventh embodiment applies the real-time judgment paper sheet moving correction to the color image and applies the real-time paper sheet moving correction to the monochrome image. The eighth correction mode of the eighth embodiment applies the most recent prediction correction to the color image and applies the real-time paper sheet moving correction to the monochrome image.

The fifth to the eighth correction modes for the printing position in the main-scanning direction are set by the input operation to the operation panel 62 illustrated in FIG. 9.

The following describes the uses of the fifth to eighth correction modes according to the need. First, the fifth correction mode of the fifth embodiment applies the real-time paper sheet moving correction to both the color image and the monochrome image.

The real-time paper sheet moving correction is a correction method that obtains the displacement amount of the recording paper sheet in the main-scanning direction for each recording paper sheet and moves the moving frame 213 in the main-scanning direction to eliminate the displacement of the recording paper sheet. In view of this, the printing position of the toner image in the main-scanning direction on the recording paper sheet is maintained at high accuracy. However, when moving the moving frame 213 in the main-scanning direction, since the conveyance of the recording paper sheet is stopped, the image formation time for each recording paper sheet lengthens. Therefore, the number of printed sheets per unit time is reduced. Therefore, in the case of color image, assuming the number of printed sheets per unit time when the image formation position in the main-scanning direction is not corrected is 100%, the number of printed sheets per unit time is reduced to around 80%. Similarly, in the case of monochrome image as well, assuming the number of printed sheets per unit time when the image formation position in the main-scanning direction is not corrected is 100%, the number of printed sheets per unit time is reduced to around 80%. In the comparison between the color image and the monochrome image, since conveyance stop time of the recording paper sheet is set the same, the number of printed sheets per unit time does not greatly differ between the color image and the monochrome image.

In the fifth correction mode, since such real-time paper sheet moving correction is applied to both the color image and the monochrome image, the printing position of the toner image in the main-scanning direction on the recording paper sheet is maintained at high accuracy. Accordingly, the number of printed sheets per unit time is reduced to around 80%. In view of this, to prioritize image qualities of color image and monochrome image, the fifth correction mode is selected and set.

Next, the sixth correction mode of the sixth embodiment applies the all-average-value prediction correction to the color image and applies the real-time paper sheet moving correction to the monochrome image.

The all-average-value prediction correction uses the average value of the all displacement amounts obtained from the certain number of respective past print jobs to correct the image formation position(s) of the toner image(s) in the sub-scanning direction on the plurality of or the single photosensitive drum(s) 13. Accordingly, this method eliminates the need for moving the moving frame 213 in the main-scanning direction like the real-time paper sheet moving correction. Additionally, before the line sensor 203 detects the side edge position of the recording paper sheet in the main-scanning direction (or is not restricted by the detection), the operation of forming the toner image(s) on the plurality of or the single photosensitive drum(s) 13 can be started. Accordingly, the image formation time for each recording paper sheet is the shortest time same as the case where the image formation position in the main-scanning direction is not corrected. These do not reduce the number of printed sheets per unit time.

In the real-time paper sheet moving correction, assuming the number of printed sheets per unit time when the image formation position in the main-scanning direction is not corrected is 100%, the number of printed sheets per unit time is reduced to around 80%.

In view of this, to make the number of printed sheets per unit time for the color image the largest while maintaining the image quality of color image and monochrome image at high accuracy, the sixth correction mode is selected.

Next, the seventh correction mode of the seventh embodiment applies the real-time judgment paper sheet moving correction to the color image and applies the real-time paper sheet moving correction to the monochrome image.

The real-time judgment paper sheet moving correction is a correction method that obtains the displacement amount of the recording paper sheet in the main-scanning direction of each recording paper sheet. Only when the displacement amount is equal to or more than the predetermined value, this method reduces the displacement of the recording paper sheet. In view of this, the printing position of the toner image in the main-scanning direction on the recording paper sheet is mostly maintained at high accuracy. This method restricts the moving amount of the moving frame 213 in the main-scanning direction to the certain amount. This allows shortening the time required to move the moving frame 213 and reducing the degree of reduction in the number of printed sheets per unit time more than that of the real-time paper sheet moving correction. For example, in both the color image and the monochrome image, assuming the case where the number of printed sheets per unit time when the image formation position in the main-scanning direction is not corrected is 100%, the number of printed sheets per unit time is reduced to around 90%. Compared with the real-time paper sheet moving correction where the number of printed sheets per unit time is reduced to around 80%, the degree of reduction in the number of printed sheets per unit time becomes the half.

However, in the comparison between the monochrome image and the color image, the number of printed sheets per unit time with the CPM of 100% of the monochrome image is larger than that of the color image. In view of this, in the case where the number of printed sheets per unit time of the color image is reduced to 90% and the number of printed sheets per unit time of the monochrome image is reduced to 80%, the reduction in the CPM for the color image is less likely to be recognized.

In view of this, to cause the reduction in the CPM of the color image to be less likely to be recognized while maintaining the image quality of color image and monochrome image at high accuracy, the seventh correction mode is selected.

Next, the eighth correction mode of the eighth embodiment applies the most recent prediction correction to the color image, and applies the real-time paper sheet moving correction to the monochrome image.

Regarding the first recording paper sheet, the most recent prediction correction starts forming the electrostatic latent image(s) on the surface(s) of the plurality of or the single photosensitive drum(s) 13 after detecting the side edge position of the recording paper sheet in the main-scanning direction by the line sensor 203; therefore, the image formation time becomes long. However, regarding the second and later recording paper sheets, before the line sensor 203 detects the side edge position of the recording paper sheet in the main-scanning direction (or is not restricted by the detection), the operation of forming the electrostatic latent image(s) on the plurality of or the single photosensitive drum(s) 13 can be started. Accordingly, the image formation time for each recording paper sheet is the shortest time same as the case where the image formation position in the main-scanning direction is not corrected. This increases the number of printed sheets per unit time. In view of this, in continuous printing of many recording paper sheets, the CPM of both the color image and the monochrome image is approximately the same as those of the all-average-value prediction correction.

In the real-time paper sheet moving correction, assuming the number of printed sheets per unit time when the image formation position in the main-scanning direction is not corrected is 100%, the number of printed sheets per unit time is reduced to around 80%.

In view of this, to maintain the image quality for the color image and the monochrome image at high accuracy from the first recording paper sheet and to increase the number of printed sheets per unit time of the color image, the eighth correction mode is selected.

Thus, the image forming apparatus illustrated in FIG. 11 and FIG. 12 can select and set the fifth to eighth correction modes, allowing improving ease of use. Additionally, regarding both the color image and the monochrome image, the degree of reduction in the number of printed sheets per unit time falls within 80%. The reduction in the CPM is less likely to be recognized.

The preferred embodiments according to the present invention are described above with reference to the attached drawings; however, it is needless to say that the present invention is not limited to the above examples. It would be obvious that an ordinary skilled person conceives various modifications and corrections within scopes defined in the claims, and it should be understood that those modified examples fall within the technical scope of the present invention.

INDUSTRIAL APPLICABILITY

The present invention is suitable to an image forming apparatus that allows selectively prints any of a color image and a monochrome image on a recording paper sheet.

This application is based on and claims priority to Japanese Patent Application 2012-204604, filed on Sep. 18, 2012 and Japanese Patent Application 2013-172275, filed on Aug. 22, 2013, the entire contents of which are incorporated herein by reference.

DESCRIPTION OF REFERENCE SIGNS 1 image forming apparatus
2 document reading apparatus
3 document conveyance apparatus (ADF)
4 printing unit
5 sheet feed cassette
6 paper sheet conveying unit
11 light scanning device
12 development apparatus
13 photosensitive drum
14 drum cleaning apparatus
15 charging apparatus
17 fixing apparatus
21 intermediate transfer belt
22 belt cleaning apparatus
23 secondary transfer apparatus
33 pickup roller
34 registration roller
35 conveyance roller
36 discharge roller
56 line sensor (paper sheet position detection section)
57 conveyance direction paper sheet sensor (conveyance direction paper sheet detection section)
61 control unit 62 operation panel (correction method selection operation section)
64 memory
67 image processing unit
201 downstream side conveyance roller
202 downstream side guide member
203 line sensor
204 downstream side paper sheet sensor
205 registration unit
206 upstream side guide member
207 upstream side paper sheet sensor
208 upstream side conveyance roller
211 registration roller
212 skew correction roller
213 moving frame
221 rack gear
222 motor for movement
223 pinion gear
231, 241 driven gear
232, 242 intermediate gear
233, 243 drive gear
244 gear
234 motor for driving
235, 246 electromagnetic clutch

The invention claimed is:

1. An image forming apparatus, comprising:
a registration roller configured to adjust a starting time point of conveying a paper sheet;
a printing section configured to form a color image or a monochrome image on an image carrier and transfer the color image or the monochrome image from the image carrier to the paper sheet at a downstream side with respect to the registration roller in a conveyance direction of the paper sheet to print;
a paper sheet position detection section configured to detect a conveyance position of the paper sheet at an upstream side with respect to the printing section in the conveyance direction of the paper sheet; and
a control section configured to:
obtain a displacement amount of the paper sheet with respect to a preset reference position of the paper sheet based on the conveyance position of the paper sheet detected by the paper sheet position detection section,
correct an image formation position of the color image or the monochrome image on the image carrier according to the displacement amount to correct a printing position of the color image or the monochrome image on the paper sheet,
change a correction method for the printing position according to whether any of the color image and the monochrome image is formed,
perform prediction correction for the color image preceding transfer of the color image on the paper sheet to correct the image formation position of the color image on the image carrier according to a displacement amount of another paper sheet based on a conveyance position of the other paper sheet detected by the paper sheet position detection section in a past, and
perform real-time correction for the monochrome image preceding transfer of the monochrome image on the paper sheet to correct the image formation position of the monochrome image on the image carrier according to the displacement amount of the paper sheet based on the conveyance position of the paper sheet on which the monochrome image is to be transferred, the conveyance position being detected by the paper sheet position detection section.

2. The image forming apparatus according to claim 1, wherein
a maximum number of printed sheets of paper sheets per unit time of when the prediction correction is performed is larger than a maximum number of printed sheets of paper sheets per unit time of when the real-time correction is performed.

3. The image forming apparatus according to claim 1, wherein
the image forming apparatus has a plurality of correction methods including the prediction correction and the real-time correction, and
the control section is configured to selectively apply any of the plurality of correction methods to both the color image and the monochrome image to correct the image formation position of the color image or the monochrome image on the image carrier.

4. The image forming apparatus according to claim 3, wherein
the image forming apparatus is configured to make the plurality of correction methods correspond to the color image and the monochrome image to set a plurality of combinations of correction methods for the color image and correction methods for the monochrome image different from one another as a plurality of correction modes, the plurality of correction modes including a correction mode, the correction mode being configured to perform the prediction correction on the color image and perform the real-time correction on the monochrome image,
the image forming apparatus includes a correction method selection operation section configured to be operated for selecting any of the plurality of correction modes, and
the control section is configured to correct the image formation position of the color image or the monochrome image on the image carrier according to a correction mode selected by the correction method selection operation section.

5. The image forming apparatus according to claim 1, wherein
the paper sheet position detection section is configured to detect the conveyance position of the paper sheet in a direction perpendicular to the conveyance direction of the paper sheet, and
the control section is configured to obtain a displacement amount of the paper sheet with respect to the reference position preset in the direction perpendicular to the conveyance direction of the paper sheet based on the conveyance position of the paper sheet, so as to correct the image formation position of the color image or the monochrome image on the image carrier in the direction perpendicular to the conveyance direction of the paper sheet according to the displacement amount.

6. The image forming apparatus according to claim 1, further comprising:
a conveyance direction paper sheet detection section configured to detect a conveyance timing of the paper sheet in the conveyance direction of the paper sheet at the downstream side with respect to the registration roller in the conveyance direction of the paper sheet; and
a correction instruction operation section configured to be operated to instruct whether to correct the image formation position of the color image or the monochrome image on the image carrier in the conveyance direction of the paper sheet or not, wherein the control section is configured to correct the image formation position of the color image or the monochrome image on the image carrier in the conveyance direction of the paper sheet according to the conveyance timing of the paper sheet detected by the conveyance direction paper sheet detection section, so as to correct the printing position of the color image or the monochrome image on the paper sheet when the correction instruction operation section instructs correction of the image formation position.

7. The image forming apparatus according to claim 1, further comprising a moving section disposed at an upstream side with respect to the printing section in the conveyance direction of the paper sheet, the moving section being configured to move the paper sheet in a direction perpendicular to the conveyance direction of the paper sheet, wherein the paper sheet position detection section is configured to detect the conveyance position of the paper sheet in the direction perpendicular to the conveyance direction of the paper sheet, and the control section is configured to: obtain a displacement amount of the paper sheet with respect to a reference position in the direction perpendicular to the conveyance direction of the paper sheet based on the conveyance position of the paper sheet detected by the paper sheet position detection section, and control the moving section according to the displacement amount of the paper sheet, so as to move the paper sheet in the direction perpendicular to the conveyance direction of the paper sheet to correct the printing position of the color image or the monochrome image on the paper sheet.

8. The image forming apparatus according to claim 7, wherein the control section is configured: to judge whether the displacement amount of the paper sheet is equal to or more than a predetermined value or not, to correct the displacement amount of the paper sheet if the displacement amount of the paper sheet is equal to or more than the predetermined value, and not to correct the displacement amount of the paper sheet if the displacement amount of the paper sheet is less than the predetermined value.

9. The image forming apparatus according to claim 7, wherein the control section is configured to: correct the image formation position of the color image on the image carrier to correct the printing position of the color image on the paper sheet for the color image, and control the moving section so as to move the paper sheet in the direction perpendicular to the conveyance direction of the paper sheet to correct the printing position of the monochrome image on the paper sheet for the monochrome image.

10. The image forming apparatus according to claim 7, wherein the moving section is configured to move the registration roller in a middle of conveyance of the paper sheet by the registration roller in the direction perpendicular to the conveyance direction of the paper sheet to move the paper sheet.

* * * * *